(12) United States Patent
Shaw et al.

(10) Patent No.: US 10,926,492 B2
(45) Date of Patent: Feb. 23, 2021

(54) BI-DIRECTIONAL LAMINATION HEAD AND METHOD

(71) Applicant: The Boeing Company, Chicago, IL (US)

(72) Inventors: Paul D. Shaw, Charleston, SC (US); James R. Kendall, Mt. Pleasant, SC (US); Raviendra S. Suriyaarachchi, Daniel Island, SC (US); Darrell D. Jones, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 313 days.

(21) Appl. No.: 16/178,415

(22) Filed: Nov. 1, 2018

(65) Prior Publication Data
US 2020/0139648 A1    May 7, 2020

(51) Int. Cl.
*B29C 70/38* (2006.01)

(52) U.S. Cl.
CPC .................. *B29C 70/388* (2013.01)

(58) Field of Classification Search
CPC .... B32B 70/382; B32B 70/384; B32B 70/388
See application file for complete search history.

(56) References Cited

U.S. PATENT DOCUMENTS

| | | | |
|---|---|---|---|
| 4,234,374 A | 11/1980 | Frank | |
| 4,259,144 A | 3/1981 | Ballentine | |
| 4,285,752 A | 8/1981 | Higgins | |
| 5,397,415 A | 3/1995 | Manabe | |
| 5,954,917 A * | 9/1999 | Jackson | B29C 70/342 156/433 |
| 7,137,182 B2 | 11/2006 | Nelson | |
| 7,527,759 B2 | 5/2009 | Lee et al. | |
| 7,591,294 B2 * | 9/2009 | Wampler | B29C 70/388 156/523 |
| 7,655,168 B2 | 2/2010 | Jones et al. | |
| 7,879,177 B2 | 2/2011 | McCowin et al. | |

(Continued)

FOREIGN PATENT DOCUMENTS

EP    2130666    12/2009

OTHER PUBLICATIONS

EPO, European Search Report for Appl. No. EP19203884, dated Mar. 30, 2020.

*Primary Examiner* — Scott W Dodds

(57) ABSTRACT

A lamination head having bi-directional layup capability has a material supply drum configured to support a material roll of backed material which is comprised of layup material backed by a backing layer. A backing layer separation assembly receives the backed material from the material supply drum and has a backing layer directional control device and first and second backing layer separation mechanisms. The backing layer directional control device in the first mode separation position is aligned with the first backing layer separation mechanism for separating the backing layer from the layup material as the lamination head moves along a first direction of travel. The backing layer directional control device in the second mode separation position is aligned with the second backing layer separation mechanism for separating the backing layer from the layup material as the lamination head moves along a second direction of travel.

20 Claims, 21 Drawing Sheets

(56) References Cited

U.S. PATENT DOCUMENTS

| | | |
|---|---|---|
| 7,922,856 B2 | 4/2011 | Hagman et al. |
| 8,012,291 B2 | 9/2011 | Kisch et al. |
| 8,206,540 B2 | 6/2012 | Evans |
| 8,336,596 B2 | 12/2012 | Nelson et al. |
| 8,465,613 B2 | 6/2013 | Rotter et al. |
| 8,640,757 B2 | 2/2014 | McCowin et al. |
| 8,758,538 B2 | 6/2014 | Borgmann et al. |
| 8,808,490 B2 | 8/2014 | Hagman et al. |
| 9,399,338 B1 | 7/2016 | Metschan |
| 2014/0150964 A1 | 6/2014 | Schaaf |
| 2015/0328876 A1 | 11/2015 | Nishimura |

\* cited by examiner

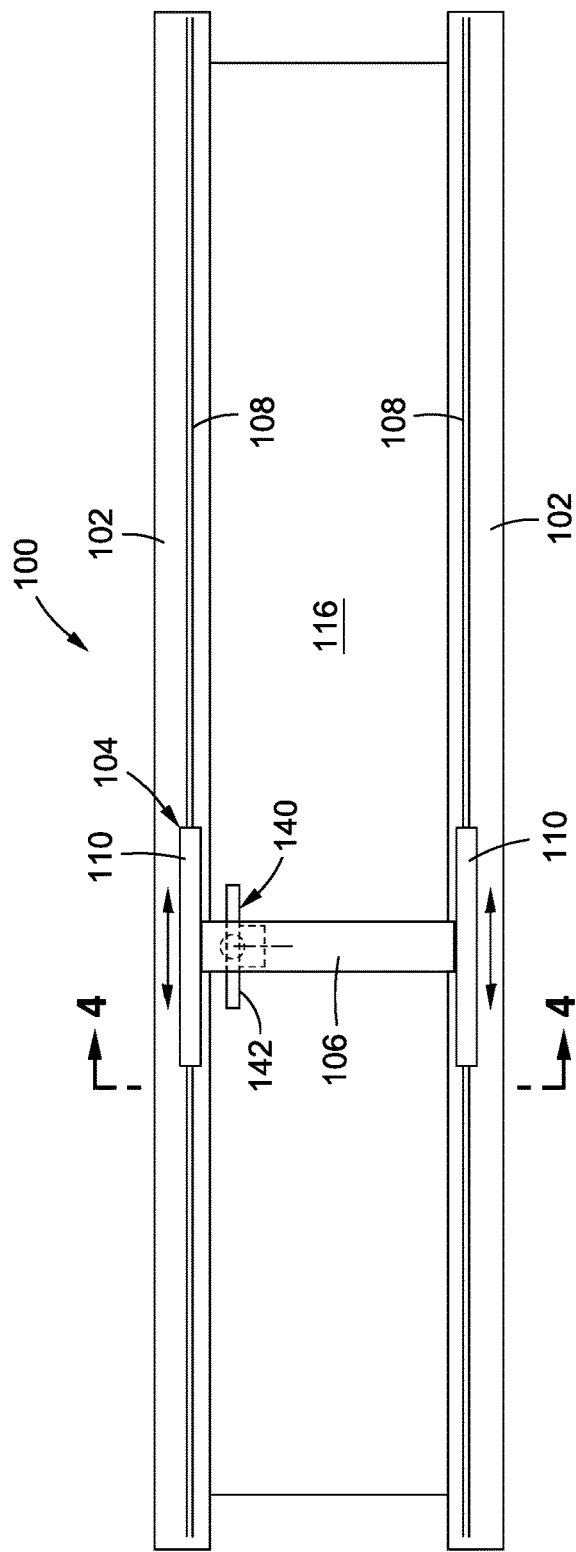
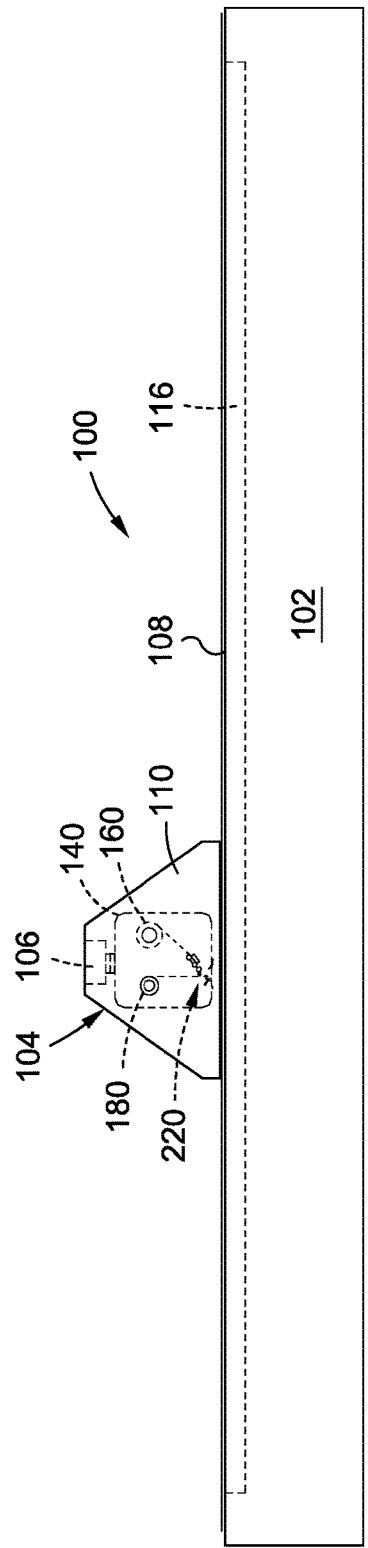
FIG. 2
FIG. 3

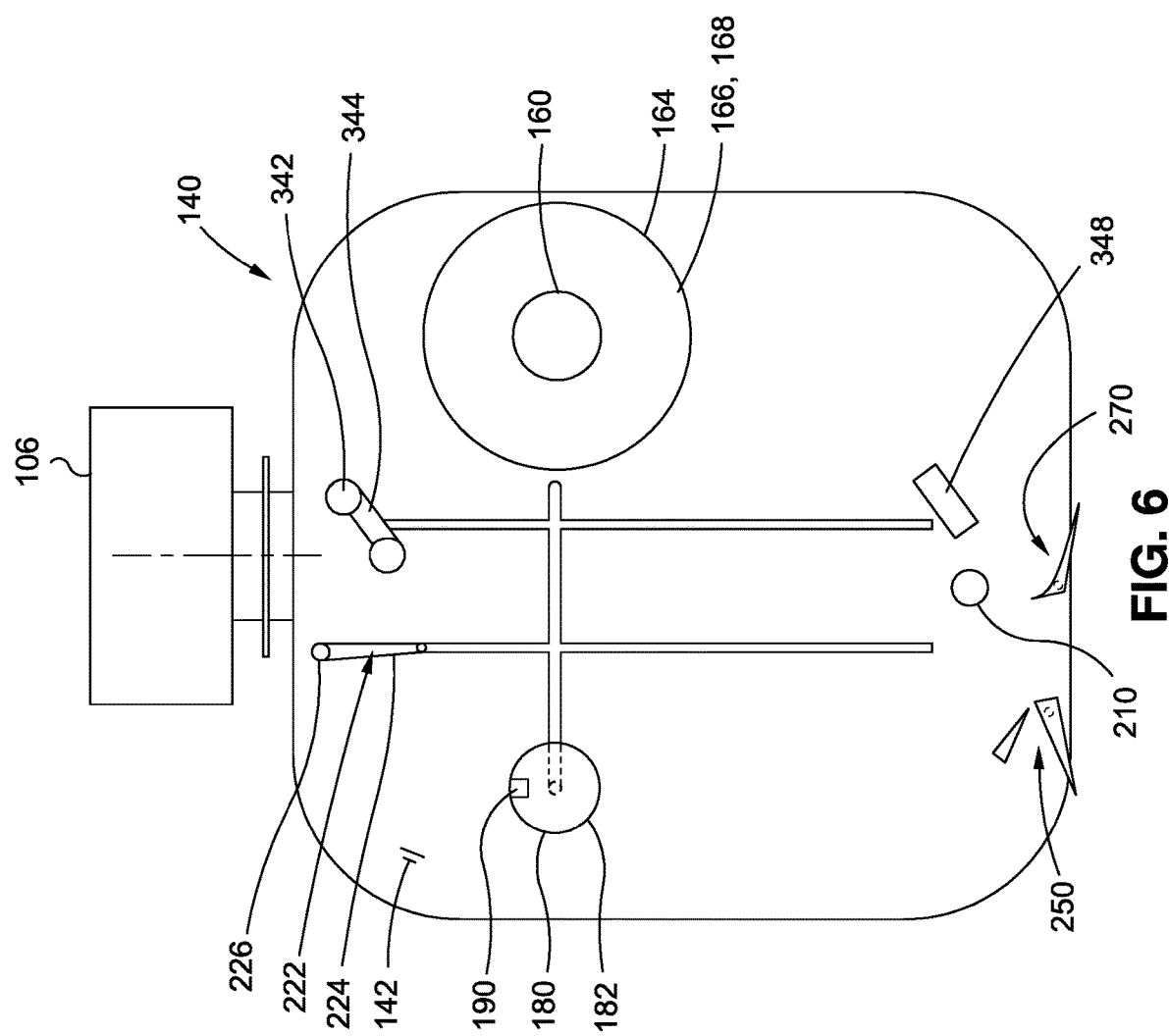

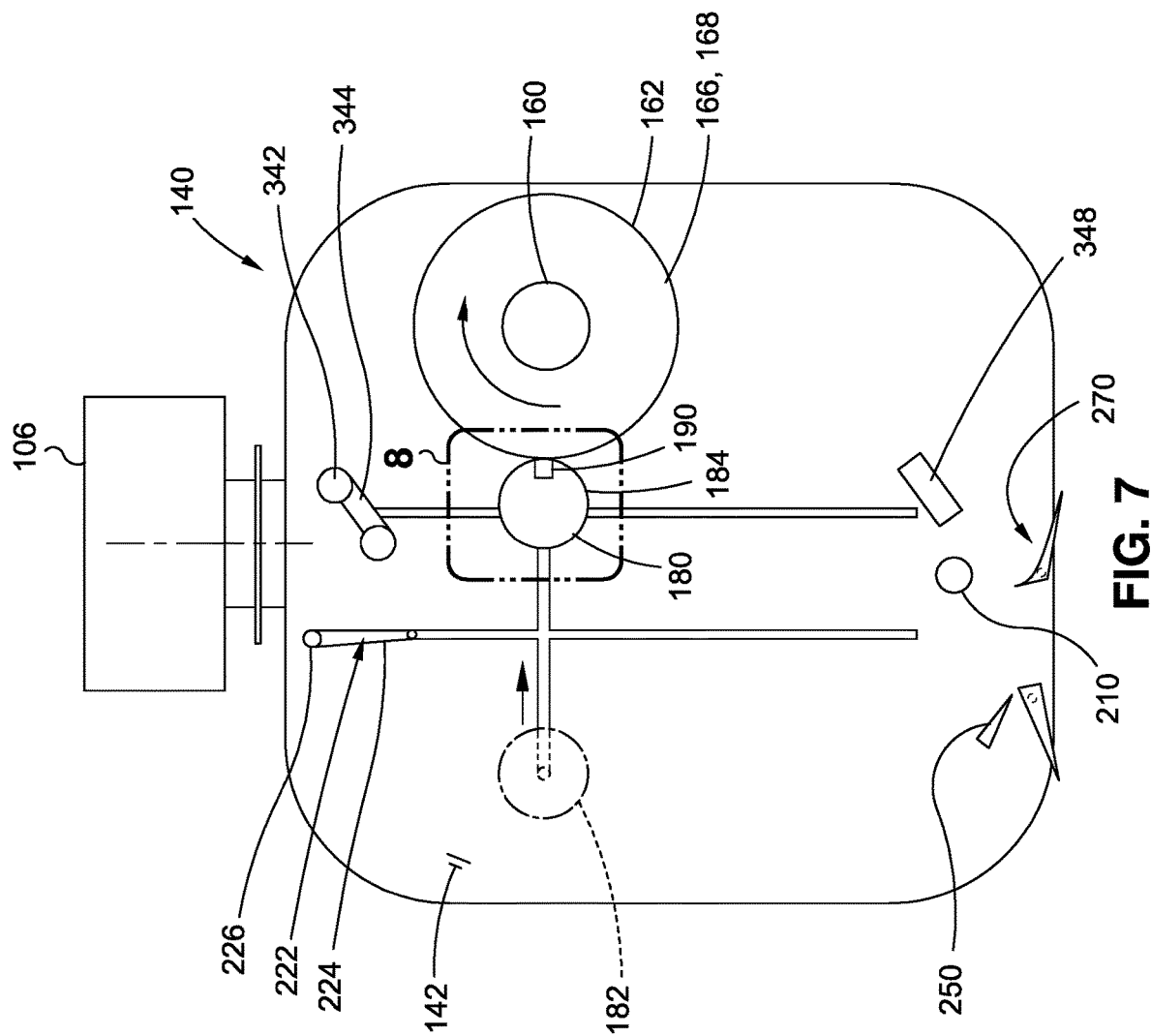

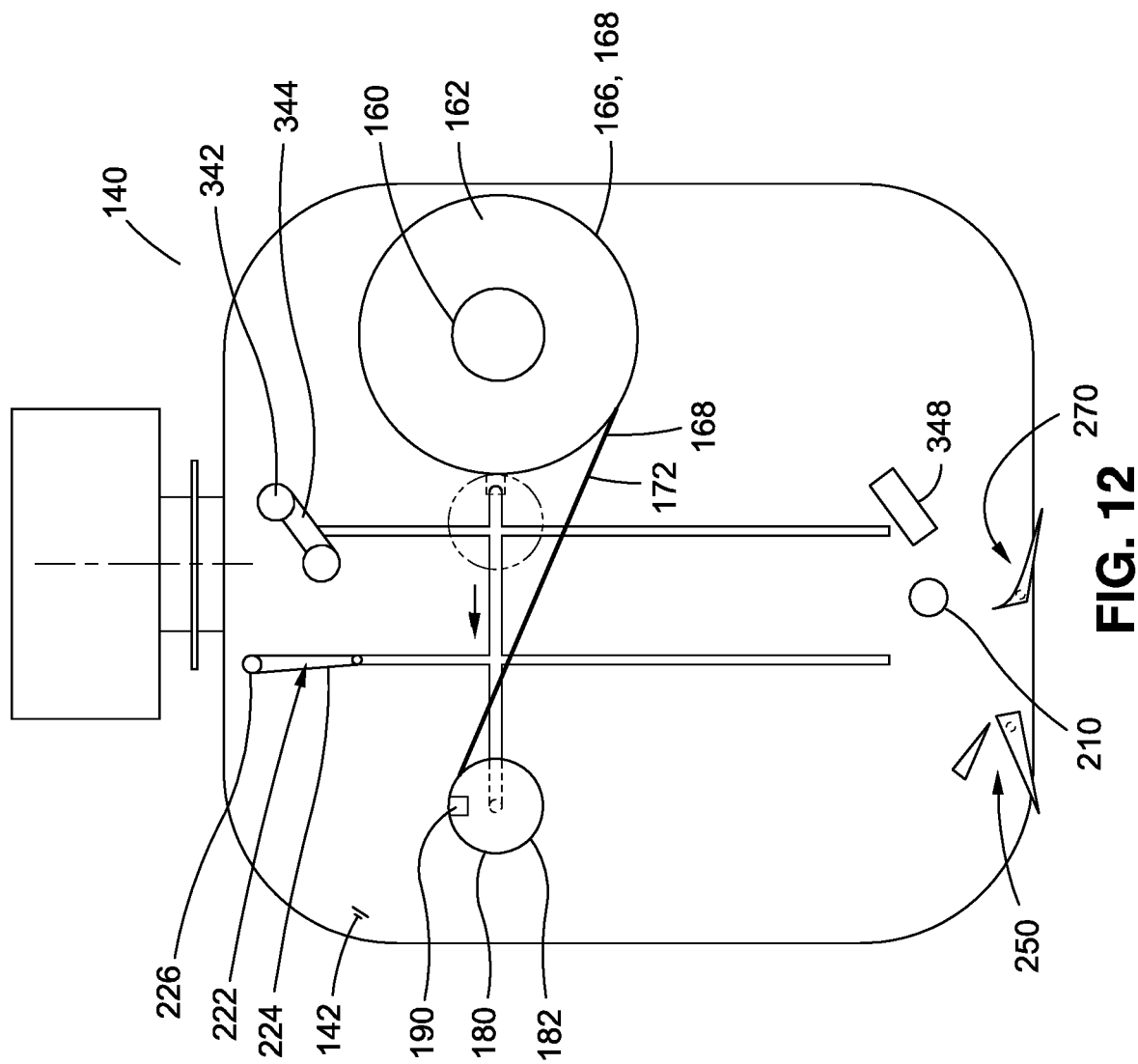

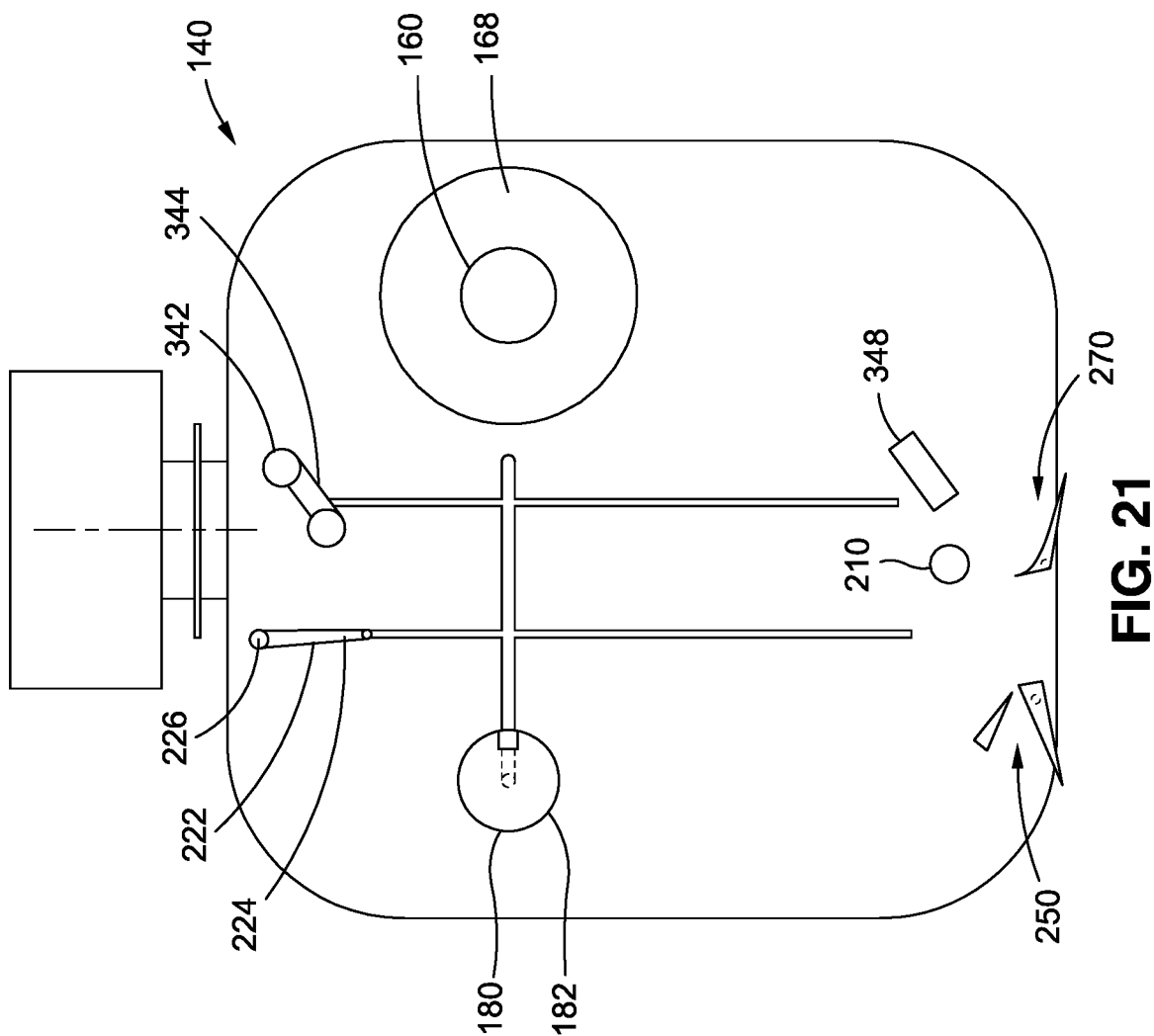

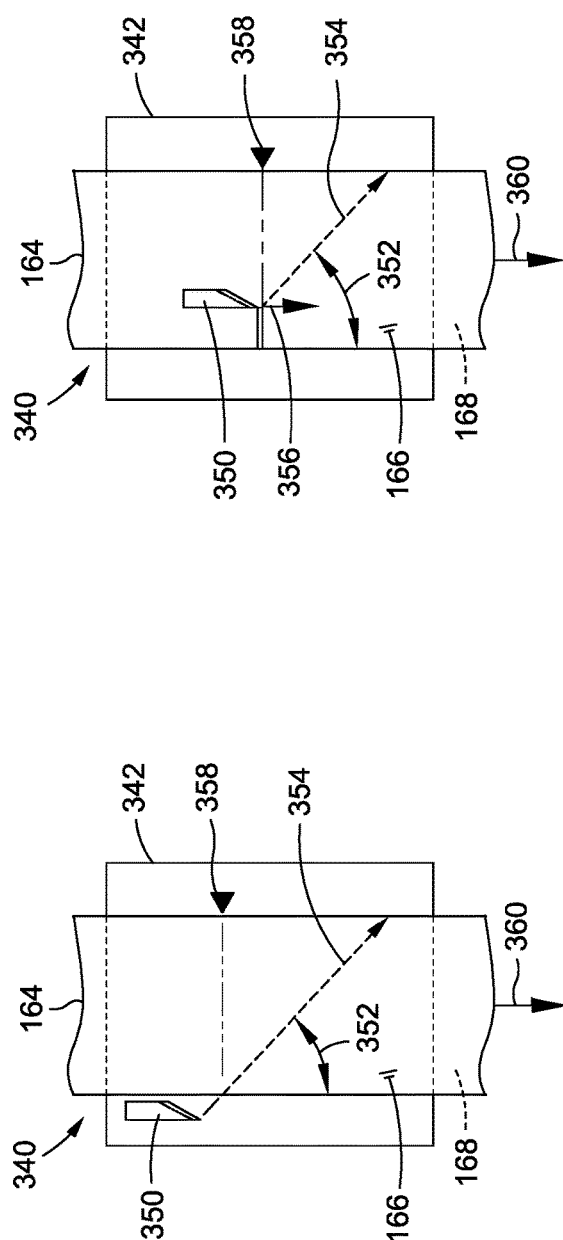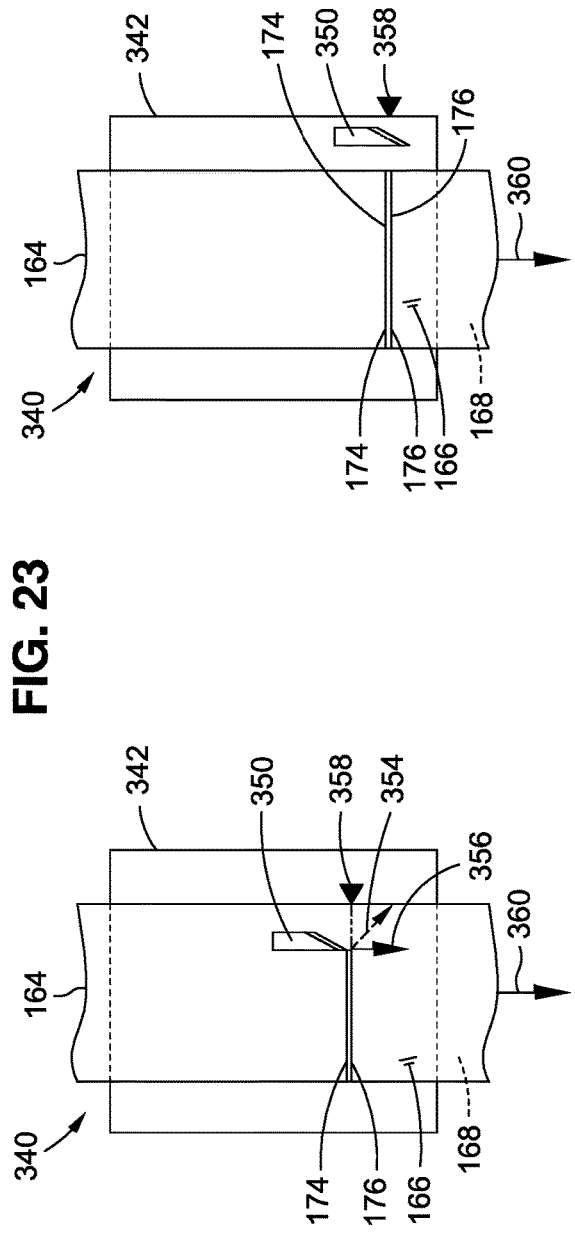

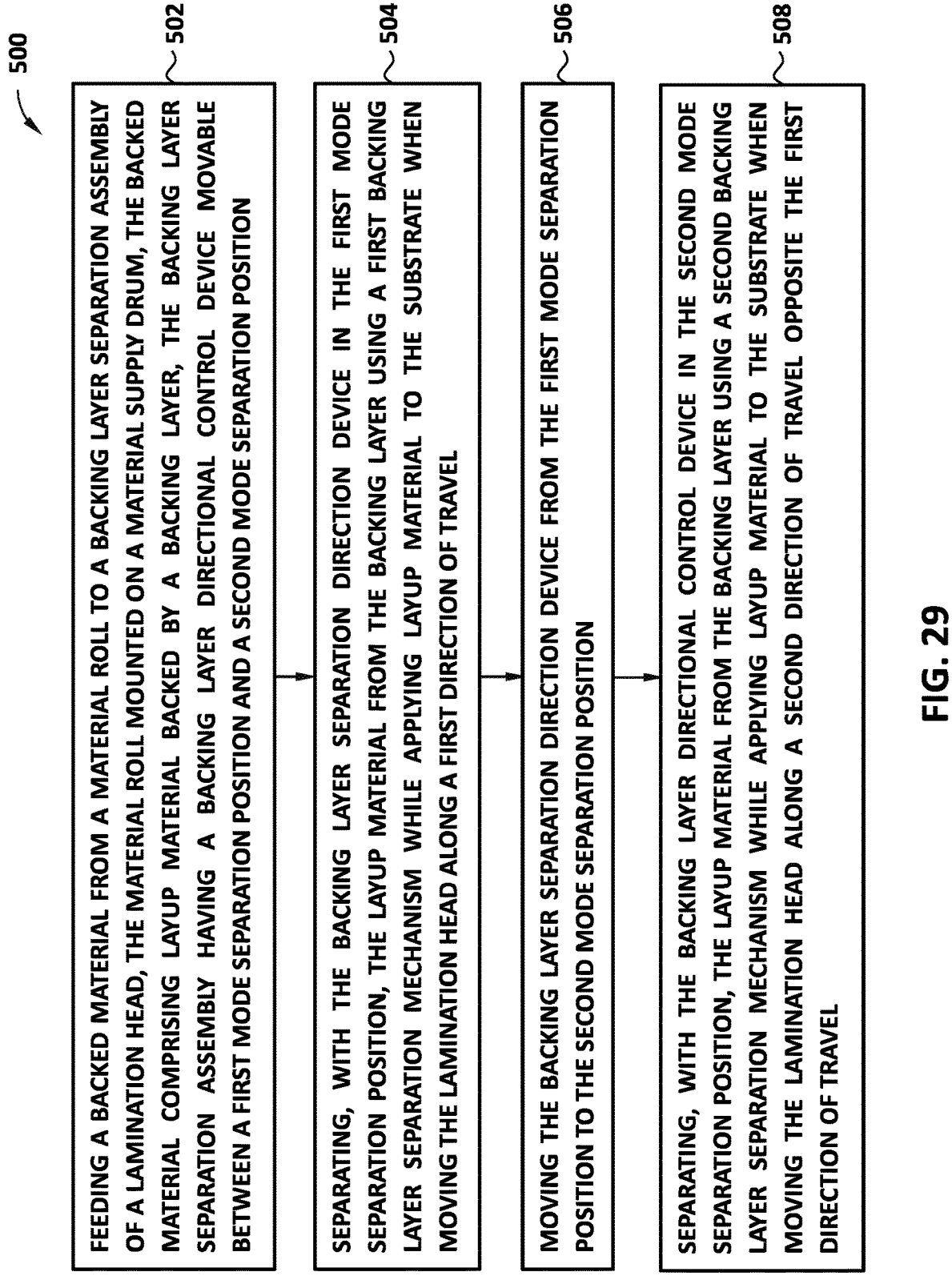

BI-DIRECTIONAL LAMINATION HEAD AND METHOD

FIELD

The present disclosure relates generally to manufacturing systems and, more particularly, to a lamination head for laying up composite laminates and having bi-directional layup capability.

BACKGROUND

Composite materials are used in a wide variety of applications due to their favorable properties such as high specific strength, high specific stiffness, and high corrosion resistance. The manufacturing of a composite structure typically involves the laying up of multiple plies of layup material in a stacked formation on a layup surface to form a composite laminate. The layup material is typically a fibrous material that is pre-impregnated with uncured resin (e.g., prepreg). For example, the layup material may be epoxy-impregnated carbon fiber prepreg.

Automated layup machines enable the layup of composite laminates at relatively high production rates due to the relatively high deposition rates of automated layup machines. A tape lamination head is one type of automated layup machine in which a continuous strip of layup material such as prepreg tape is dispensed from the lamination head onto a layup surface as the lamination head is moved over the layup surface. A lamination head may form each composite ply by successively laying up rows or courses of tape in side-by-side parallel relation to each other.

A conventional lamination head may lay up each new course of tape while moving in a first direction of travel. At the end of a course, the lamination head lifts off of the layup surface and moves back over the layup surface in a second direction of travel opposite the first direction of travel and starts applying another course of tape along the first direction. The off-part movement of the lamination head each time it moves along the second direction undesirably adds to production flow time.

Certain types of lamination heads may be configured to rotate 180 degrees at the end of a first course, and then reverse direction to lay up a second course of layup material alongside or over the first course. The capability for rotating the lamination head adds complexity to the lamination system due to the need to rotate the entire weight of the lamination head, the material supply, support cabling, and other associated components. Further adding to the complexity is the need to temporarily lift the lamination head off of the layup surface prior to rotation, and then lower the lamination head back down onto the layup surface once rotation is complete.

A further drawback associated with conventional lamination heads is regarding the initial threading of the tape that must performed prior to laying up tape. Prepreg tape is typically provided in roll form on a material supply drum which is then mounted on the lamination head. To prevent adhesion between the adjacent windings of prepreg tape on the material roll, the prepreg tape is backed by a backing layer. As the tape is dispensed from the material roll and applied to the layup surface, the backing layer is removed and is wound onto a backing layer collection drum mounted on the lamination head. When the material roll is depleted of tape, it is necessary to changeout the depleted material roll and install a new material roll on the lamination head. After each material roll changeout, the tape from the new material roll must be threaded through the lamination head components and onto the backing layer collection drum.

In conventional lamination heads, the process of threading the tape is a time-consuming operation that can result in significant lamination head downtime. During the course of laying up a single composite laminate, it may be necessary to perform numerous material roll changeouts, each of which requires manual threading of the tape which adds to the lamination head downtime and increases production flow time.

As can be seen, there exists a need in the art for a lamination head that reduces off-part movement of the lamination head. In addition, there exists a need in the art for a lamination head that allows for rapid threading of tape through the lamination head.

SUMMARY

The above-noted needs associated with manufacturing composite laminates are specifically addressed and alleviated by the present disclosure which provides a lamination head having self-threading capability and/or bi-directional layup capability. In an embodiment, the lamination head has self-threading capability and includes a material supply drum, a backing layer collection drum, and a backing layer separation assembly. The material supply drum is configured to support a material roll of backed material. The backed material comprises layup material backed by a backing layer. The backing layer collection drum is configured to move from a collection drum home position to a collection drum engagement position proximate the material supply drum, engage a backing layer leading edge of the backing layer on the material roll, and move back to the collection drum home position while dispensing a threadable portion of at least the backing layer between the material supply drum and the backing layer collection drum. The backing layer separation assembly has a backing layer separation device and at least one backing layer separation mechanism. The backing layer separation device is configured to translate from a separation device home position to a separation device engagement position and engage the threadable portion for moving the threadable portion into proximity to the backing layer separation mechanism for separating the backing layer from the layup material prior to application of the layup material onto a substrate.

In a further example, a lamination head having self-threading capability includes a material supply drum configured to support a material roll of backed material. As mentioned above, the backed material comprises layup material backed by a backing layer. In addition, the lamination head includes a backing layer collection drum configured to move from a collection drum home position to a collection drum engagement position proximate the material supply drum, engage a backing layer leading edge of the backing layer on the material roll, and move back to the collection drum home position while dispensing a threadable portion of at least the backing layer between the material supply drum and the backing layer collection drum. The lamination head also includes a backing layer separation assembly having a backing layer separation device and at least one backing layer separation mechanism. The backing layer separation device is configured to translate from a separation device home position to a separation device engagement position and engage the threadable portion for moving the threadable portion into proximity to the backing layer separation mechanism for separating the backing layer from the layup material prior to application of the layup material onto a substrate. The backing layer separation mechanism has a backing layer separator configured to separate the backing layer from the layup material and direct the layup material toward the substrate.

Also disclosed is a method of threading layup material through a lamination head. The method includes supporting, on a material supply drum, a material roll of backed material. The backed material comprises layup material backed by a backing layer. The method further includes translating a backing layer collection drum from a collection drum home position to a collection drum engagement position proximate the material supply drum, engaging the backing layer collection drum to a backing layer leading edge of the backing layer on the material roll, and translating the backing layer collection drum back to the collection drum home position while dispensing a threadable portion of at least the backing layer between the material supply drum and the backing layer collection drum. The method additionally includes translating a backing layer directional control device from a separation device home position to a separation device engagement position. The method also includes moving, in response to translation of the backing layer directional control device, the threadable portion into proximity to at least one backing layer separation mechanism configured to separate the backing layer from the layup material prior to application of the layup material onto a substrate.

In addition, disclosed is a lamination head having bi-directional layup capability. The lamination head includes a material supply drum configured to support a material roll of backed material. The backed material comprises layup material backed by a backing layer. The lamination head includes a backing layer separation assembly configured to receive the backed material from the material supply drum. The lamination head as a backing layer directional control device, a first backing layer separation mechanism, and a second backing layer separation mechanism. The backing layer directional control device is movable at least between a first mode separation position and a second mode separation position. The backing layer directional control device in the first mode separation position is aligned with the first backing layer separation mechanism for separating the backing layer from the layup material while the layup material is applied to a substrate as the lamination head moves along a first direction of travel. The backing layer directional control device in the second mode separation position is aligned with the second backing layer separation mechanism for separating the backing layer from the layup material while the layup material is applied to the substrate as the lamination head moves along a second direction of travel opposite the first direction of travel.

In a further example, a lamination head having self-threading capability includes a material supply drum configured to support a material roll of backed material. The backed material comprises layup material backed by a backing layer. The lamination head includes a backing layer separation assembly configured to receive the backed material from the material supply drum and having a backing layer directional control device, a first backing layer separation mechanism, and a second backing layer separation mechanism. The backing layer directional control device is movable at least between a first mode separation position and a second mode separation position. The backing layer directional control device in the first mode separation position is aligned with the first backing layer separation mechanism. The first backing layer separation mechanism has a first backing layer separator configured to separate the backing layer from the layup material and direct the layup material toward the substrate as the lamination head moves along a first direction of travel. The backing layer directional control device in the second mode separation position is aligned with the second backing layer separation mechanism. The first backing layer separation mechanism as a second backing layer separator configured to separate the backing layer from the layup material and direct the layup material toward the substrate as the lamination head moves along a second direction of travel.

Also disclosed is a method of bi-directionally applying layup material onto a substrate. The method includes feeding a backed material from a material roll to a backing layer separation assembly of a lamination head. The material roll is supported on a material supply drum. The backed material comprises layup material backed by a backing layer. The backing layer separation assembly has a backing layer directional control device movable between a first mode separation position and a second mode separation position. The method additionally includes separating, with the backing layer directional control device in the first mode separation position, the layup material from the backing layer using a first backing layer separation mechanism while applying layup material to the substrate when moving the lamination head along a first direction of travel. The method also includes moving the backing layer directional control device from the first mode separation position to the second mode separation position and separating, with the backing layer directional control device in the second mode separation position, the layup material from the backing layer using a second backing layer separation mechanism while applying layup material to the substrate when moving the lamination head along a second direction of travel opposite the first direction of travel.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 2 is a top view of an example of the manufacturing system showing a gantry supporting the lamination head;

FIG. 3 is a side view of the manufacturing system of FIG. 2;

FIG. 6 is a front view of the lamination head having a material supply drum supporting a material roll of backed material comprising a layup material backed by a backing layer, and further illustrating a backing layer collection drum shown located in a collection drum home position, a cutter platen shown in a platen home position, a backing layer separation device shown in a separation device home position, a first backing layer separation assembly, and a second backing layer separation assembly;

FIG. 7 is a view of the lamination head showing the backing layer collection drum after movement from the collection drum home position to a collection drum engagement positioned adjacent to the material supply drum;

FIG. 12 is a view of the lamination head showing the backing layer collection drum moved to the collection drum home position while dispensing a threadable portion of the backing layer between the material supply drum and the backing layer collection drum;

FIG. 21 is a view of the lamination head showing the backing layer collection drum moved back to the collection drum home position and further illustrating the backing layer wound on the material supply drum;

FIG. 22 is a view of the cutter platen taken along line 22-22 of FIG. 21 and illustrating an example of a cutter blade moving across the backed material along a blade angle path that is complementary to the material feed rate of the backed material;

FIG. 23 is a view of the cutter platen showing further progression of the cutter blade along the plate path angle to cut the layup material along an intended cut line;

FIG. 24 is a view of the cutter plotting showing still further progression of the cutter plate during cutting of the layup material along the intended cut line oriented perpendicular to lengthwise direction of the backed material;

FIG. 25 is a view of the cutter platen after cutting the backed material along the intended cut line;

FIG. 29 is a flowchart of operations included in a method of bi-directionally applying layup material onto a substrate.

DETAILED DESCRIPTION

Figure 1:
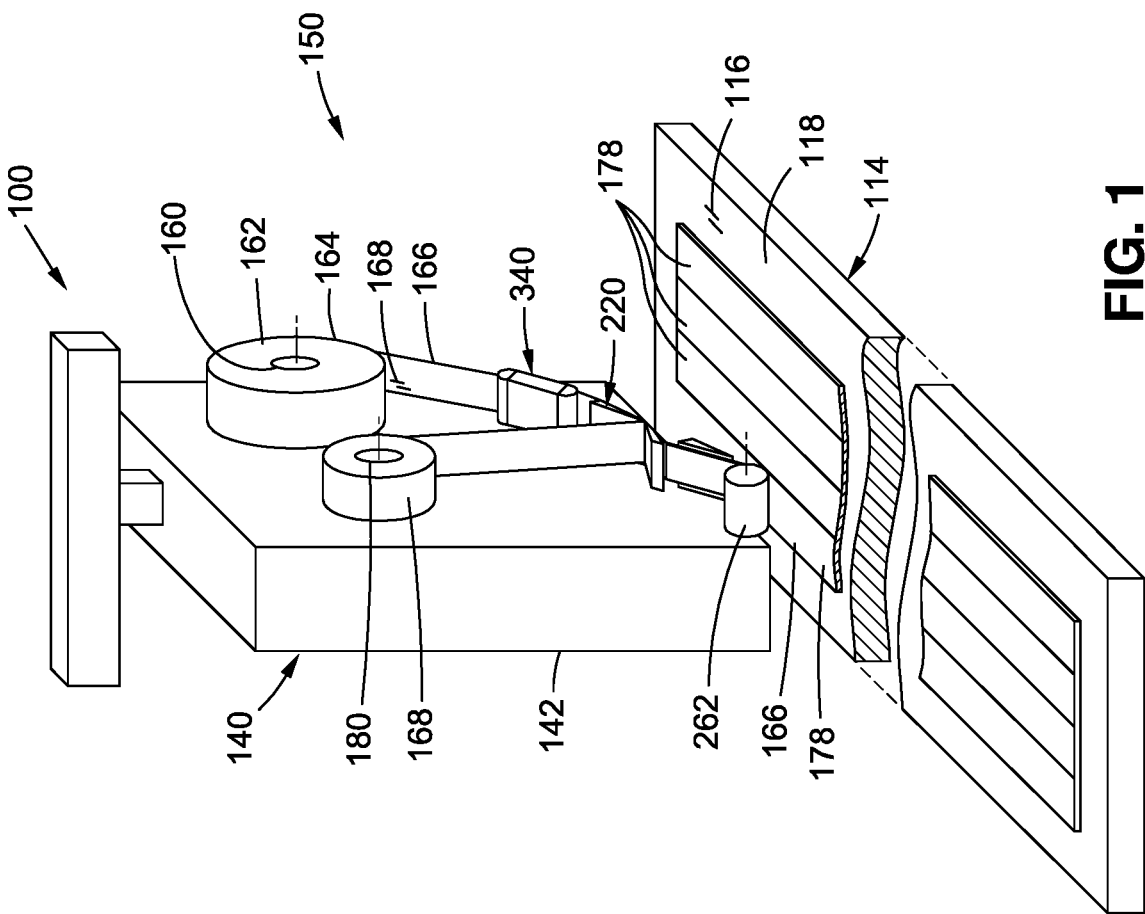
FIG. 1 is perspective view of a manufacturing system showing an example of a lamination head applying layup material to a substrate.

Referring now to the drawings which illustrate preferred and various embodiments of the disclosure, shown in FIG. 1 is perspective view of a manufacturing system 100 showing an example of a lamination head 140 applying a course 178 of layup material 166 onto a substrate 118 configured as a layup surface 116 of a layup tool 114 such as a mandrel. The lamination head 140 includes a material supply drum 160 which may be mounted to a mounting frame 142 which may be configured as a plate or as a skeleton or truss structure. The material supply drum 160 is configured to support a material roll 162 of backed material 164. The backed material 164 comprises a continuous strip of layup material 166 (e.g., prepreg tape) backed by a strip of backing layer 168. The lamination head 140 further includes a backing layer separation assembly 220 configured to separate the backing layer 168 from the layup material 166 and guide the layup material 166 toward the substrate 118. In addition, the lamination head 140 includes lamination head components such as a cutter assembly 340 configured to cut the layup material 166 as the lamination head 140 approaches each designated start location and end location of a course 178 of layup material 166. The lamination head 140 additionally includes a backing layer collection drum

180 configured to take up the backing layer 168 onto the backing layer collection drum 180 after separation of the backing layer 168 from the layup material 166.

In an embodiment, the lamination head 140 is configured to have self-threading capability in which the backing layer 168 is automatically (e.g., without manual intervention) threaded from the material roll 162 and through the lamination head components and onto the backing layer collection drum 180, as described in greater detail below. Advantageously, the self-threading capability of the lamination head 140 reduces lamination head downtime during the changeout of material rolls 162. The reduction in lamination head downtime reduces production flow time and allows a corresponding increase in the composite laminate 179 production rate. In addition, the self-threading capability of the lamination head 140 reduces production costs by eliminating the need for personnel to manually thread the backing layer 168 through the lamination head 140 each time a material roll 162 is changed out.

Additionally or alternatively, the lamination head 140 is configured to have bi-directional layup capability in which the lamination head 140 is configured to apply layup material 166 to a substrate 118 in a first direction of travel 370 (FIG. 16) and also apply layup material 166 to the substrate 118 in a second direction of travel 372 (FIG. 18) opposite the first direction of travel 370, as described in greater detail below. Advantageously, the bi-directional capability of the lamination head 140 reduces off-part movement of the lamination head 140 that would otherwise be required if the lamination head 140 were limited to applying layup material 166 in a single direction of travel or if the lamination head 140 needed to be both lifted and rotated 180 degrees prior to applying layup material 166 in an opposite direction. For example, a lamination head 140 limited to laying up in a single direction of travel requires the lamination head 140 to lift off of the layup surface 116 at the end of each course 178 of layup material 166, move back over the layup surface 116 in a second direction of travel 372 opposite the first direction of travel 370, and start applying another course 178 of layup material 166 parallel to the previous course 178 while moving along the first direction of travel 370. As may be appreciated, the bi-directional layup capability of the lamination head 140 eliminates off-part movement along the second direction of travel 372 which significantly reduces production flow time. In some examples, a lamination head 140 configured to have self-threading capability may or may not be configured to have bi-directional layup capability, as described below. In other examples, a lamination head 140 configured to have bi-directional layup capability may or may not be configured to have self-threading capability, as described below.

Referring to FIGS. 2-5, shown is an example of a lamination head 140 supported on a gantry 104 for moving the lamination head 140 over a layup surface 116 configured as a mandrel. The gantry 104 may include one or more elongated base members 102 supported on a surface such as a factory floor. The gantry 104 may include a generally horizontally-oriented gantry crossbeam 106 having opposing ends respectively coupled to a pair of generally vertically-oriented beam supports 110. Each one of the beam supports 110 may be supported on one of the base members 102 via a gantry track 108 that extends along a lengthwise direction of the base members 102. The beam supports 110 may be movable along the gantry tracks 108 via one or more linear actuation mechanisms (not shown) for moving the lamination head 140 along a lengthwise direction of the mandrel parallel to the gantry tracks 108. In addition, the lamination head 140 may be movable via a linear actuation mechanism (not shown) along a horizontal track (not shown) incorporated into the gantry crossbeam 106 for moving the lamination head 140 along a transverse direction perpendicular to the gantry tracks 108. Furthermore, the gantry crossbeam 106 may be vertically movable for moving the lamination head 140 along a vertical direction parallel to a vertical axis 148 (FIGS. 4-5) of the lamination head 140. For example, the opposing ends of the gantry crossbeam 106 may be movable along vertical tracks (not shown) via linear actuation mechanisms (not shown) that may be incorporated into the beam supports 110. Although the figures illustrate a vertical axis 148 of the lamination head 140, the need to rotate the lamination head 140 about the vertical axis 148 during the laying up of a composite laminate is advantageously avoided due to the bi-directional layup capability of the lamination head 140. However, the lamination head 140 may be rotated about the vertical axis 148 to facilitate the performance of certain non-lamination activities such as to provide improved access for performing maintenance on the head components of the lamination head 140 or when replacing one or more material rolls 162 on the lamination head 140. A lamination head 140 having self-threading capability but lacking bi-directional layup capability as mentioned below may also be rotated about the vertical axis 148 to provide the capability for dispensing layup material 166 in opposite directions.

Although shown supported by a gantry 104, the lamination head 140 may be supported by any one of a variety of arrangements including, but not limited to, a robotic device, a cantilevered support system, a rail-mounted system, or other arrangements. In addition, the lamination head 140 is not limited to applying layup material 166 to a static layup surface 116, and may include applying layup material 166 to a movable forming tool such as a translatable and/or rotatable mandrel. In a further embodiment, the lamination head 140 may be fixed or non-movable, and the layup surface 116 or substrate 118 may be moved relative to the lamination head 140 as the lamination head 140 applies layup material 166 to the substrate 118. In the present disclosure, the substrate 118 may be the layup surface 116 of a layup tool 114, or the substrate 118 may be a most recently applied layer of layup material 166.

In the present disclosure, movement of the lamination head 140 along the above-mentioned lengthwise direction, the transverse direction and the vertical direction may be controlled by a controller 130 (FIG. 4) executing computable readable program instructions (e.g., a numerical control program). In addition, the below-described movements of the lamination head components enabling self-threading of the lamination head 140 may also be controlled by the controller 130 as may the movements of the lamination head components enabling bi-directional application of layup material 166 onto a substrate 118. For example, the material supply drum 160 and the backing layer collection drum 180 (FIG. 5) may each be actively rotatably driven by a motor (not shown) controlled by the controller 130. Alternatively, the material supply drum 160 (and optionally the backing layer collection drum 180) may be passively rotatably driven as a result of the movement of the layup material 166 during dispensing onto the layup surface 116 or onto previously-applied layup material 166 once the layup material 166 is tacked down. The below-described movement (e.g., translation) of the backing layer collection drum 180 during threading of the lamination head 140 may be facilitated by a linear actuation mechanism (not shown) such as a drive screw coupled to a servo motor that may be controlled by the controller 130. The controller 130 may also control the cutting of the layup material 166 in coordination with controlling the backing layer separation assembly 220 (FIG. 5) for separating the layup material 166 from the backing layer 168 as the layup material 166 is applied to the substrate 118 and the backing layer 168 is wound onto the backing layer collection drum 180.

Referring to FIG. 6, shown is an example of a lamination head 140 prior to the threading of the backing layer 168 (FIG. 5) from the material supply drum 160 to the backing layer collection drum 180. As mentioned above, the lamination head 140 includes a backing layer separation assembly 220 (FIG. 5) which is comprised of a backing layer separation device 222 and at least one backing layer separation mechanism 250, 270. In the example shown in the figures, the backing layer separation device 222 is configured as a backing layer directional control device 224 that is movable between a first mode separation position 304 (FIG. 16) and a second mode separation position 306 (FIG. 18) which enables bi-directional application of layup material 166 along a first direction of travel 370 (FIG. 16) and along a second direction of travel 372 (FIG. 18) opposite the first direction of travel 370, as mentioned above. However, a lamination head 140 having self-threading capability may be configured without bi-directional layup capability, in which case the backing layer separation device 222 limits the lamination head 140 to applying layup material 166 to a substrate 118 while dispensing the layup material 166 when moving along a single direction of travel (e.g., a first direction of travel 370), and being incapable of dispensing layup material 166 when moving along a second direction of travel 372 opposite the first direction of travel 370.

In FIG. 6, the backing layer separation device 222 is movable from a separation device home position 226 (FIG. 12) to a separation device engagement position 228 (FIG. 13) as part of the process of threading the backing layer 168 (FIG. 5) through the lamination head 140. The cutter assembly 340 (FIG. 5) of the lamination head 140 includes a cutter platen 342 and a cutter module 348. The cutter module 348 is movable, under control of the controller 130, from a platen home position 344 to a platen engagement position 346 (FIG. 13) causing the backing layer 168 to be captured between the cutter platen 342 and the cutter module 348. The movement of the cutter platen 342 from the platen home position 344 to the platen engagement position 346 may be part of the process of threading the backing layer 168. In the platen engagement position 346, the cutter platen 342 indexes to the cutter module 348. The cutter platen 342 may remain in the platen engagement position 346 as layup material 166 is dispensed from the lamination head 140. The cutter platen 342 may be commanded to return to the platen home position 344 when the material roll 162 is depleted of layup material 166 to allow the material roll 162 to be replaced as described below. When the cutter platen 342 is in the platen engagement position 346, the cutter module and cutter platen 342 cooperate to cut the layup material 166 upon command by the controller 130. The cutter module 348 and cutter platen 342 may cut the layup material 166 as the backing layer 168 passes through the cutter assembly 340, as described in greater detail below. The cutter module 348 and cutter platen 342 cooperate to cut the layup material 166 without cutting completely through the backing layer 168 in order to allow tension to be maintained along the length of the backing layer 168 during the dispensing of layup material 166 from the lamination head 140.

As mentioned above, the material supply drum 160 is configured to support a material roll 162 of backed material 164 comprising a continuous strip of layup material 166 backed by a backing layer 168. The layup material 166 may be a fiber-reinforced polymer matrix material such as pre-impregnated resin tape. The fibers in the tape may be unidirectional or the fibers may be arranged as a woven fabric. The layup material 166 may be provided in any one of a variety of thicknesses and widths. For example, the layup material 166 may be provided as prepreg tape in thicknesses of 0.007 inch or more and in widths of 9-12 inches although the layup material 166 may be provided in thicknesses greater than 0.007 inch and/or in widths narrower than 9 inches or wider than 12 inches. The polymer matrix material may be a thermosetting resin or a thermoplastic resin. The fibers may be carbon fibers or the fibers may be formed of alternative materials such as glass, boron, aramid, ceramic or other non-metallic materials or metallic materials. In some examples, the material supply drum 160 may be configured to support a material roll 162 of non-composite material. For example, the material roll 162 may include layup material 166 (e.g., backed by a backing layer 168) such as metallic foil or metallic mesh and which may be applied by the lamination head 140 before, during, and/or after the laying up of composite plies of a composite laminate 179 (FIG. 1).

Referring to FIGS. 6-7, the lamination head 140 includes the above-mentioned backing layer collection drum 180 which is configured to take up the backing layer 168 during separation of the backing layer 168 from the layup material 166 as the layup material 166 is applied to the substrate 118. To initiate self-threading of the lamination head 140, the backing layer collection drum 180 is configured to move from a collection drum home position 182 (FIG. 6) to a collection drum engagement position 184 (FIG. 7) proximate the material roll 162 as mounted on the material supply drum 160. In the example shown, the backing layer collection drum 180 is translated horizontally along a linear path to initiate threading of the backing layer 168. As an alternative to linear movement, the lamination head 140 may be configured such that the backing layer collection drum 180 moves along a non-linear path or along an arcuate path from the collection drum home position 182 to the collection drum engagement position 184. In the collection drum engagement position 184, the backing layer collection drum 180 is configured to engage the backing layer leading edge 170 of the backing layer 168. For example, the backing layer collection drum 180 may be configured to physically contact and positively engage the backing layer leading edge 170 (FIG. 8) on the material supply drum 160. Upon engaging the backing layer leading edge 170, the backing layer collection drum 180 is configured to translate, under control of the controller, from the collection drum engagement position 184 back to the collection drum home position 182 while dispensing a threadable portion 172 of the backing layer 168 (or backing layer 168 plus the leading portion of the layup material 166) between the material supply drum 160 and the backing layer collection drum 180 as shown in FIG. 12.

Prior to and/or during engagement of the backing layer collection drum 180 with the backing layer leading edge 170, the controller 130 may be configured to rotate the material supply drum 160 and/or the backing layer collection drum 180 such that the backing layer leading edge 170 is aligned with a backing layer pick element 190 which may be included with the backing layer collection drum 180. During movement of the backing layer collection drum 180 back to the collection drum home position 182, the controller 130 may rotate the material supply drum 160 in synchronization with rotation of the backing layer collection drum 180 to maintain a predetermined amount of tension within the threadable portion 172 of the backing layer 168. In some examples, the controller 130 may synchronize the rotation of the material supply drum 160 and the backing layer collection drum 180 to wind a certain amount (e.g., at least one complete wrap) of backing layer 168 onto the backing layer collection drum 180 as a means for securing the backing layer 168 to the backing layer collection drum 180 prior to proceeding with the threading of the layup material 166 through the lamination head 140. The amount of backing layer 168 wound onto the backing layer collection drum 180 may be dictated in part by the level of tension applied to the backing layer 168 and/or the level of friction between the backing layer 168 and the backing layer collection drum 180 required to avoid rotational slipping of the backing layer 168 on the backing layer collection drum 180.

Figure 8:
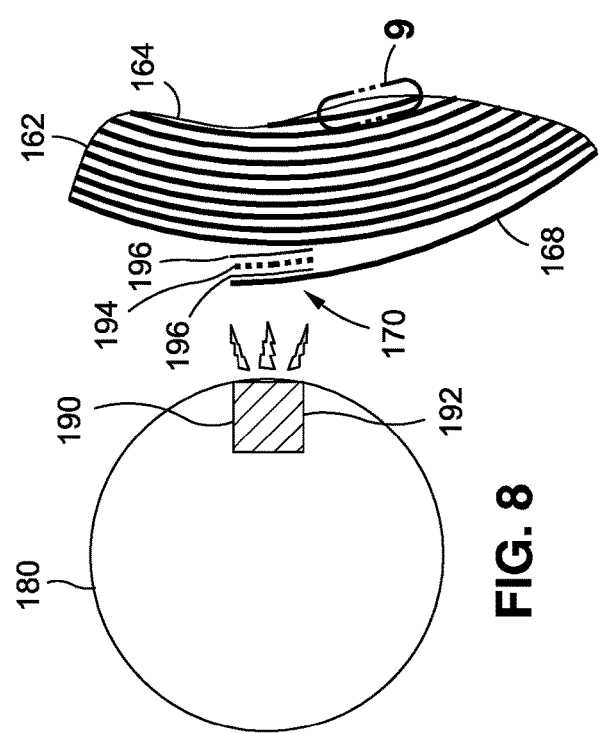
FIG. 8 is a magnified view of the encircled region identified by reference numeral 8 of FIG. 7 and illustrating the backing layer collection drum having a backing layer pick element configured as a magnet for magnetic attachment to a magnetic element mounted to a backing layer leading edge of the backing layer on the material roll.

FIG. 8 shows an example of a backing layer pick element 190 that may be included with the backing layer collection drum 180. As mentioned above, the backing layer pick element 190 is configured to engage the backing layer leading edge 170 on the material roll 162. After the backing layer pick element 190 is engaged to the backing layer leading edge 170, the backing layer collection drum 180 moves, under command of the controller 130, from the collection drum engagement position 184 in FIG. 6) back to the collection drum home position 182 (FIG. 7) thereby pulling the backing layer leading edge 170 away from the material supply drum 160.

Figure 9:
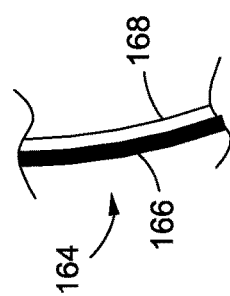
FIG. 9 is a magnified view of the encircled region identified by reference numeral 9 of FIG. 8 and illustrating the layup material and backing layer that make up the backed material wound on the material roll.

FIG. 9 shows an example of the layup material 166 and the backing layer 168 that make up the backed material 164 that is wound on the material roll 162. The outermost wraps of the material roll 162 are typically backing layer 168 only (i.e., a backing-layer-only portion) without any layup material 166. For example, the material roll 162 may be provided with an additional several feet (e.g., up to 15 feet) of backing-layer-only portion at the beginning of a material roll 162. The backing layer 168 may be formed of any material that prevents adjacent wraps of layup material 166 from sticking to each other. For example, the backing layer 168 may be paper that is silicone-coated on one side, or the backing layer 168 may be a thin plastic film such as polyethylene film.

Referring back to FIG. 8, shown is the backing layer pick element 190 configured as a magnet 192 for magnetic attachment to a magnetic element 194 that may be mounted to the backing layer leading edge 170 on the material roll 162. The magnetic element 194 may be a steel mesh or other type of magnetic or ferrous material. The magnetic element 194 is preferably flexible. In the example shown, the magnetic element 194 may be coupled to the radial inner side of the backing layer 168 at the backing layer leading edge 170. For example, the magnetic element 194 may be adhered to the radial inner side of the backing layer 168 using a first layer of double-sided adhesive tape 196. A second layer of double-sided adhesive tape 196 may be installed on a radial inner side of the magnetic element 194 for securing the backing layer leading edge 170 to the material roll 162 such that the magnetic element 194 is sandwiched between the first and second layers of double-sided adhesive tape 196. The second layer of double-sided adhesive tape 196 may be provided with relatively high tack or adhesion on the side facing the magnetic element 194, and relatively low tack or adhesion on the side facing the material roll 162. In this manner, the second layer of double-sided adhesive tape 196 remains with the magnetic element 194 as the backing layer leading edge 170 is pulled away from the material roll 162.

The combination of the magnetic element 194 and double-sided adhesive tape 196 provides an arrangement that allows for the magnet 192 of the backing layer pick element 190 to magnetically engage the magnetic element 194 on the backing layer leading edge 170 during the initiation of self-threading, and also provides a mechanism for securing the backing layer 168 after being wound back onto the material supply drum 160 (e.g., FIG. 21) after the layup material 166 is depleted, as described below.

Figure 10:
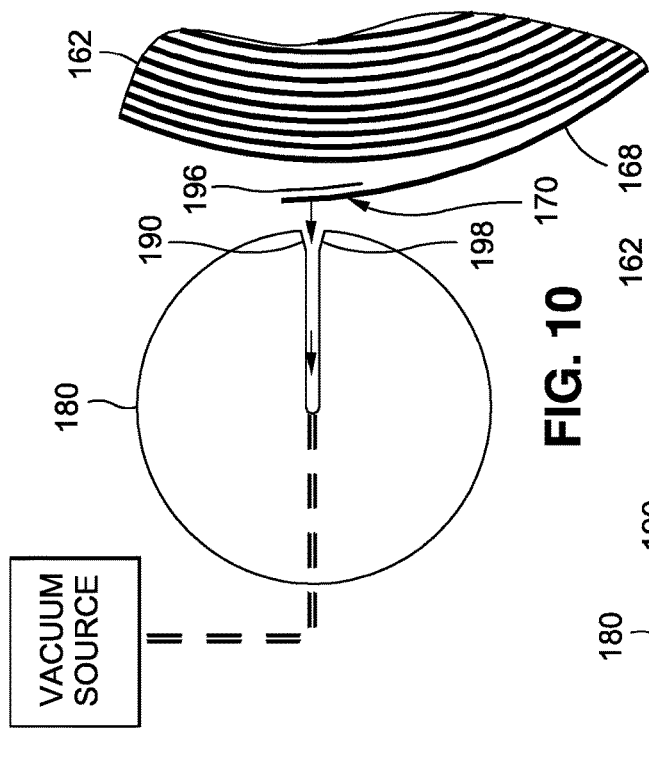
FIG. 10 is an example of the backing layer pick element configured as a vacuum nozzle fluidly coupled to a vacuum source for vacuum engagement to an outer surface of the backing layer leading edge.

FIG. 10 shows an example of the backing layer pick element 190 configured as a vacuum nozzle 198 for vacuum engagement to the radial outer surface of the backing layer leading edge 170. The vacuum nozzle 198 may be fluidly coupled to a vacuum source 200 such as a vacuum pump that may be included with the manufacturing system 100. The fluid coupling (not shown) between the vacuum nozzle 198 and the vacuum pump may extend through a shaft (not shown) of the backing layer collection drum 180. The vacuum source 200 may be activated once the backing layer collection drum 180 is in the collection drum engagement position 184 (FIG. 7) and the backing layer collection drum 180 has been rotated such that the vacuum nozzle 198 is aligned with the backing layer leading edge 170. For the arrangement of FIG. 10, a single layer of double-sided adhesive tape 196 may secure the backing layer leading edge 170 to the material roll 162 until the vacuum nozzle 198 engages the radial outer surface of the backing layer leading edge 170 and pulls the backing layer leading edge 170 away from the material roll 162 as the backing layer collection drum 180 is moved from the collection drum engagement position 184 (FIG. 7) back to the collection drum home position 182 (FIG. 12). The double-sided adhesive tape 196 may be provided with relatively high tack on the radial inner side and relatively low tack on the radial outer side of the double-sided adhesive tape 196. In this manner, the double-sided adhesive tape 196 will remain with the material roll 162 as the backing layer leading edge 170 is pulled away from the material roll 162.

Figure 11:
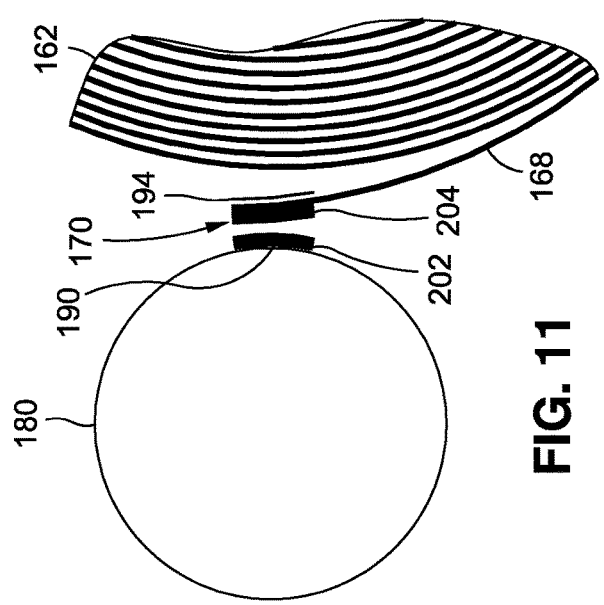
FIG. 11 is an example of the backing layer pick element configured as a hook element configured to engage a corresponding loop element mounted on the backing layer leading edge.

FIG. 11 is an example of the backing layer pick element 190 configured as a hook element 202 or a loop element 204 (e.g., Velcro™) configured to engage a corresponding loop element 204 or hook element 202 mounted on the radial outer side of the backing layer leading edge 170. Similar to the above-described arrangement of the vacuum nozzle 198, the backing layer leading edge 170 in FIG. 11 may be secured to the material roll 162 by means of a single piece of double-sided adhesive tape 196. The double-sided adhesive tape when 96 may be configured with high tack on the radial inner side and low tack on the radial outer side in the same manner described above with regard to FIG. 10.

Figure 4:
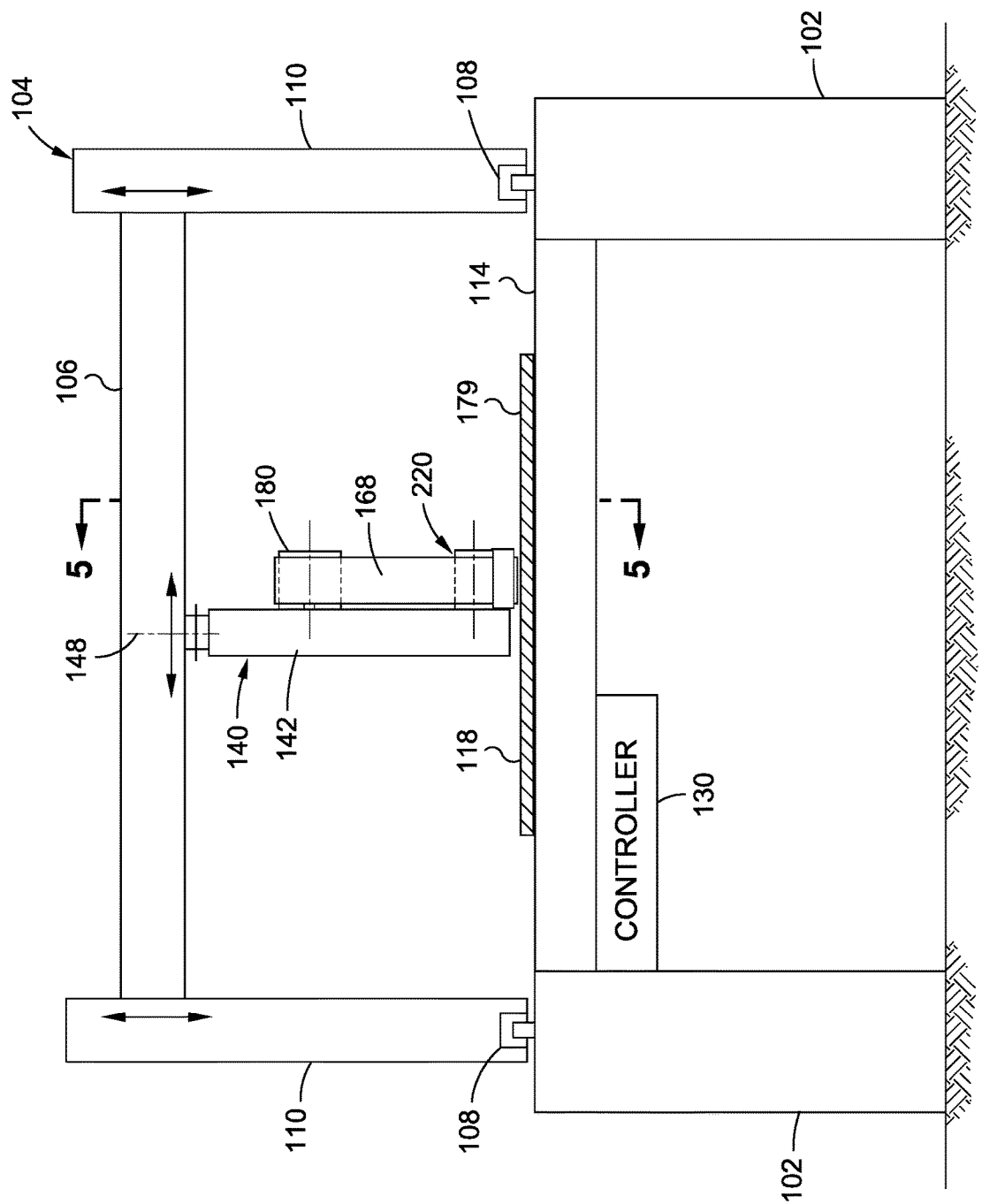
FIG. 4 is an end view of the manufacturing system of FIG. 2.
Figure 5:
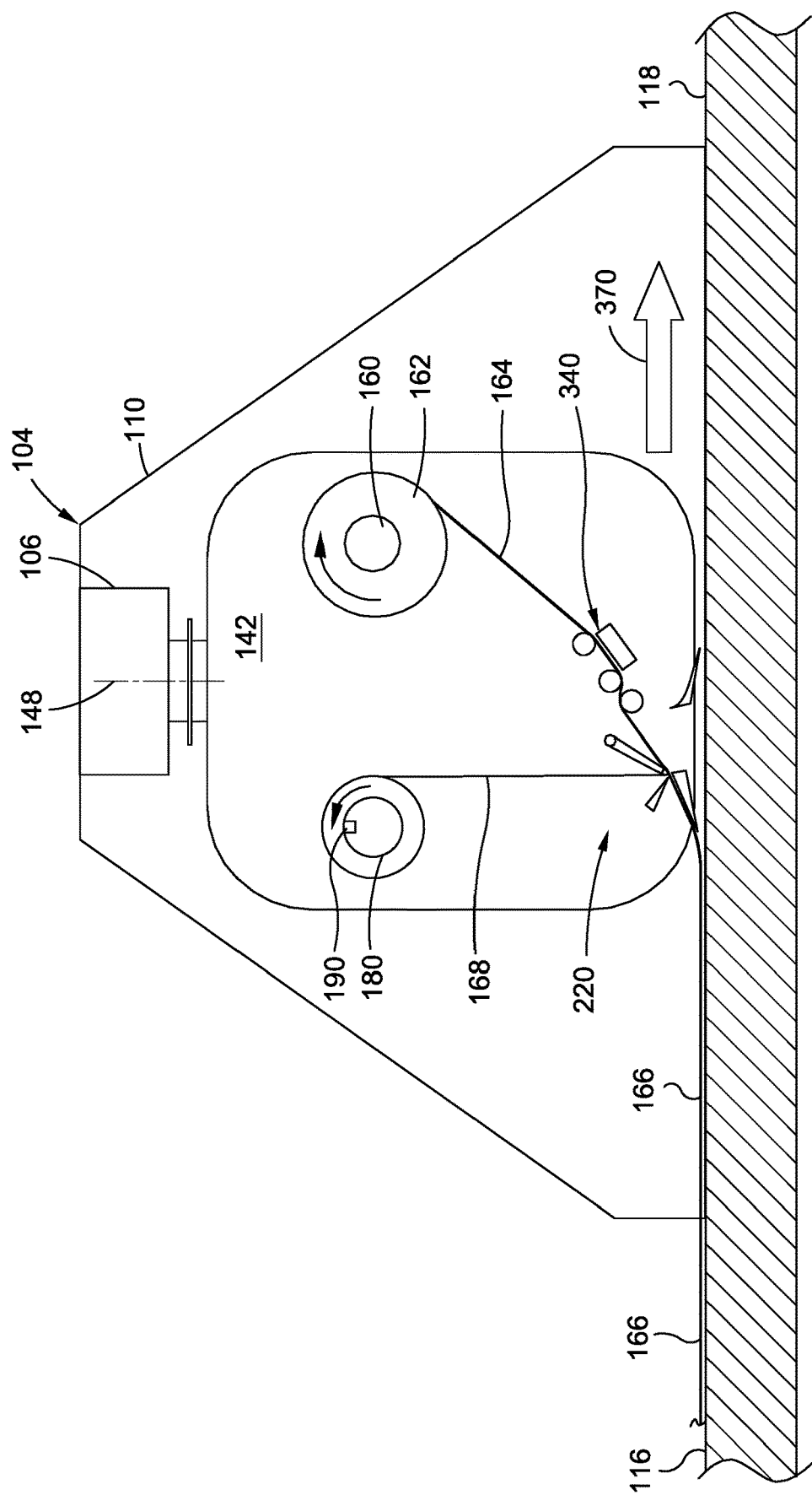
FIG. 5 is a front view of the lamination head supported by the gantry.

FIG. 12 shows the backing layer collection drum 180 after moving from the collection drum engagement position 184 (FIG. 7) to the collection drum home position 182 while dispensing the threadable portion 172 of the backing layer 168 between the material supply drum 160 and the backing layer collection drum 180. As mentioned above, movement of the backing layer collection drum 180 may be facilitated by a linear actuation mechanism (not shown) such as a drive screw rotated by a motor that is controlled by the controller 130 (FIG. 4). The controller 130 may also be configured to control the rotation of the material supply drum 160 and/or the backing layer collection drum 180 to maintain a predetermined level of tension in the threadable portion 172 during movement of the backing layer collection drum 180 from the collection drum engagement position 184 to the collection drum home position 182.

In FIG. 12, the threadable portion 172 of the backing layer 168 extends between the backing layer directional control device 224 (i.e., the backing layer separation device 222) and the at least one backing layer separation mechanism which, in the figures, is illustrated as a first backing layer separation mechanism 250 and a second backing layer separation mechanism 270. For example, the backing layer directional control device 224 is shown located above the threadable portion 172 and the first backing layer separation mechanism 250 and second backing layer separation mechanism 270 are shown located below the threadable portion 172. Similarly, the threadable portion 172 extends between the cutter platen 342 and the cutter module 348. For example, the cutter platen 342 is shown located above the threadable portion 172 and the cutter module 348 is shown located below the threadable portion 172.

Figure 13:
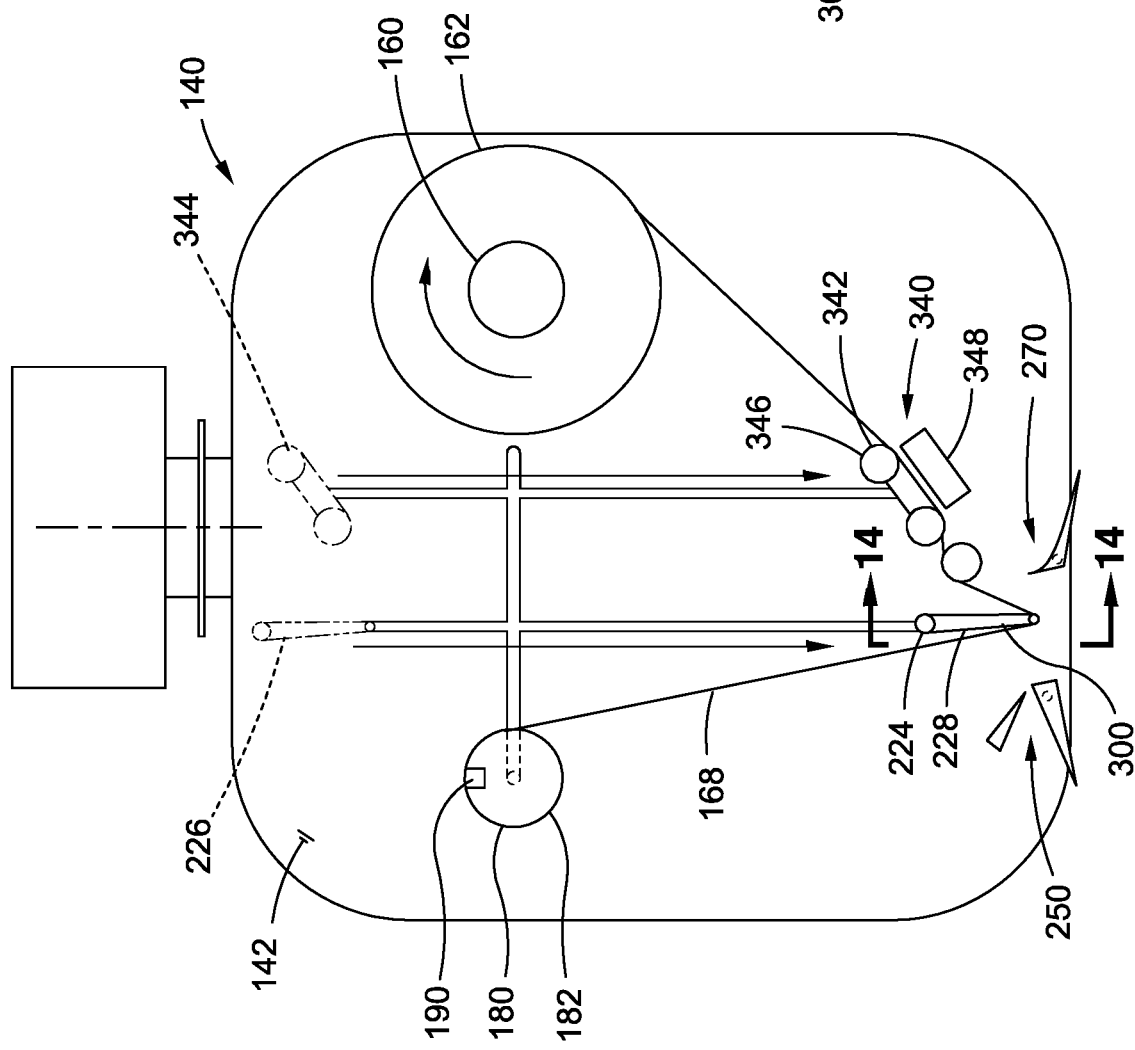
FIG. 13 is a view of the lamination head showing the backing layer separation device configured as a backing layer directional control device which is configured as a pivoting device shown moved from the separation device home position to a separation device engagement position, and further illustrating the cutter platen moved from the platen home position to a platen engagement position.

FIG. 13 shows the cutter platen 342 translated from the platen home position 344 to the platen engagement position 346. The vertically downward movement of the cutter platen 342 may be effectuated by a linear actuation mechanism (not shown) that may be controlled by the controller 130. Also shown is the backing layer directional control device 224 translated from the separation device home position 226 to a separation device engagement position 228. The vertically downward movement of the backing layer directional control device 224 may also be effectuated by a linear actuation mechanism (not shown) that may be controlled by the controller 130. During the vertically downward movement, the cutter platen 342 and the backing layer directional control device 224 engage or contact the threadable portion 172 of the backing layer 168 and drive the backing layer 168 downwardly respectively toward the cutter module 348 and the first and second backing layer separation mechanisms 250, 270. As the threadable portion 172 of the backing layer 168 is pulled downwardly, the controller 130 may control rotation of the material supply drum 160 and/or the backing layer collection drum 180 to maintain a predetermined level of tension in the threadable portion 172. The cutter platen 342 indexes to the cutter module 348 and the backing layer 168 is captured between the cutter platen 342 and the cutter module 348. The indexing of the cutter platen 342 to the cutter module 348 may be facilitated by a pin-style arrangement (not shown) or by optical laser guidance for precisely aligning the cutter platen 342 to the cutter module 348 to allow for precise control of the cutting depth of the cutter blade 350 (schematically illustrated in FIGS. 22-25) of the cutter module 348 to cut only the layup material 166 and leaving the backing layer 168 intact.

In FIG. 13, the backing layer directional control device 224 is shown in the separation device engagement position 228 which is in proximity to the first and second backing layer separation mechanisms 250, 270. In the separation device engagement position 228, the backing layer directional control device 224 may be in a neutral position 300 in which the backing layer directional control device 224 places the backing layer 168 is in non-aligned relation to either one of the first and second backing layer separation mechanisms 250, 270. In this regard, when the backing layer directional control device 224 is in the neutral position 300, the backing layer 168 is located such that neither the first backing layer separation mechanism 250 nor the second backing layer separation mechanism 270 is capable of separating the layup material 166 from the backing layer 168. The neutral position 300 may advantageously provide clearance and access to the first and second backing layer separation mechanisms 250, 270 such as for maintenance.

Figure 17:
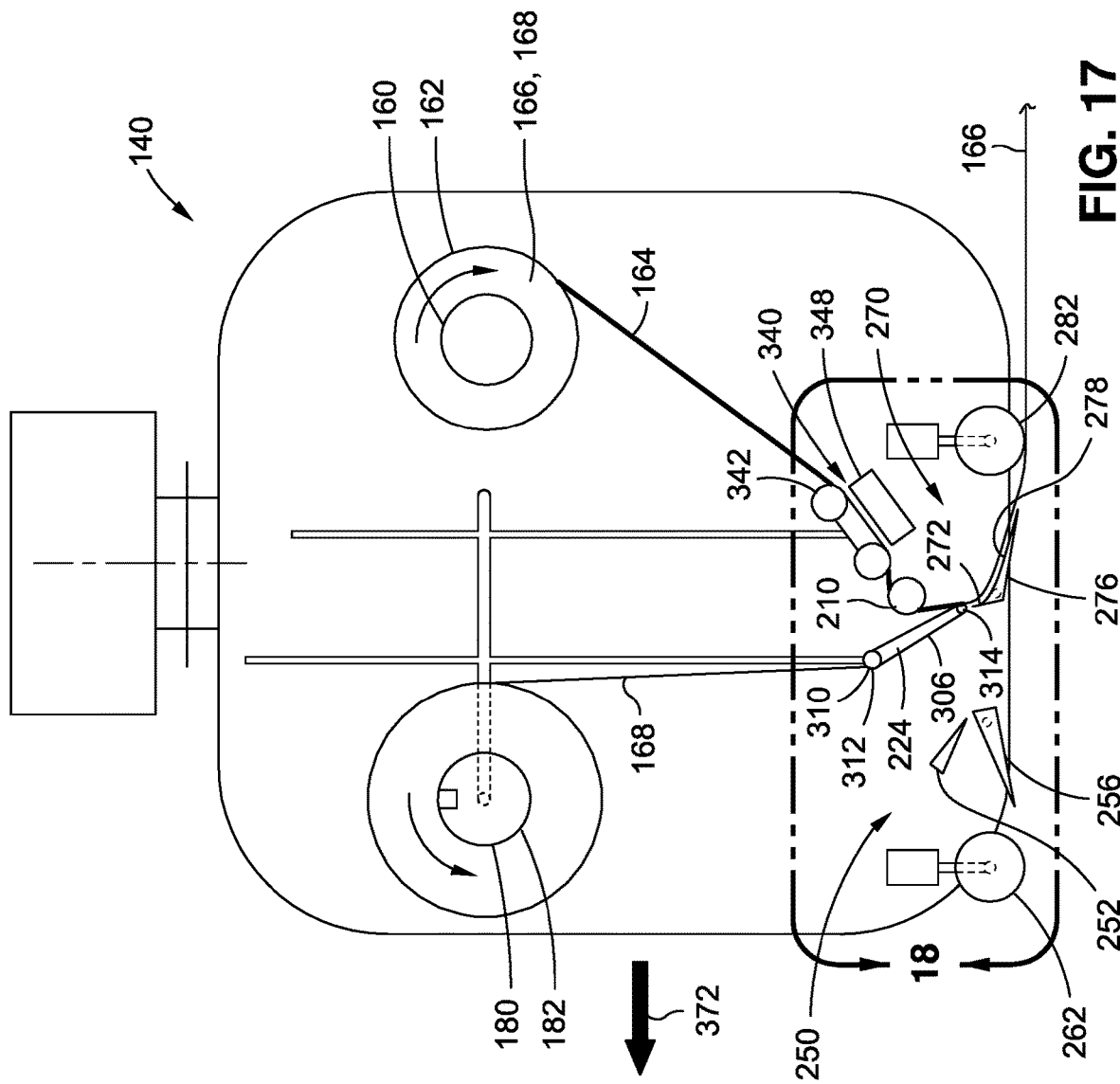
FIG. 17 is a view of the lamination head showing the backing layer directional control device moved to a second mode separation position.

In FIG. 13, the backing layer directional control device 224 may be moved from the neutral position 300 to either a first mode separation position 304 (FIG. 15) or to a second mode separation position 306 (FIG. 17). In the first mode separation position 304, the backing layer directional control device 224 places the backing layer 168 in alignment with the first backing layer separation mechanism 250, causing the first backing layer separation mechanism 250 to engage a layup material leading edge 174 (e.g., FIG. 25) of the layup material 166 when the backed material 164 is fed through the lamination head 140. The layup material leading edge 174 may be located at the tail end (not shown) of the above-mentioned backing-layer-only portion at the beginning of the material roll 162. The layup material leading edge 174 may also be the result of the cutter assembly 340 (i.e., the cutter platen 342 and cutter module 348) cutting the layup material 166 as the backed material 164 is fed through the lamination head 140, as described below with regard to FIGS. 22-25. As mentioned above, the cutter platen 342 remains in the platen engagement position 346 as layup material 166 is dispensed from the lamination head 140. The cutter module and cutter platen 342 cooperate to cut the layup material 166 upon command by the controller 130. When the backing layer directional control device 224 is in the second mode separation position 306 (FIG. 17), the backing layer directional control device 224 places the backing layer 168 in alignment with the second backing layer separation mechanism 270, causing the second backing layer separation mechanism 270 to engage the layup material leading edge 174 as the backed material 164 is fed through the lamination head 140.

In the figures, the lamination head 140 is shown having a first backing layer separation mechanism 250 and a second backing layer separation mechanism 270 and the backing layer separation device 222 is configured as a backing layer directional control device 224 movable between the first mode separation position 304 and the second mode separation position 306 and which allows for bi-directional application of the layup material 166 onto a substrate 118, as described in greater detail below. However, for the above-mentioned embodiment of a lamination head 140 having self-threading capability but lacking bi-directional layup capability, the lamination head 140 may include a single backing layer separation mechanism such as only a first backing layer separation mechanism 250 and not having a second backing layer separation mechanism 270, and the lamination head 140 may include a backing layer separation device 222 that is limited to a first mode separation position 304 and lacks a second mode separation position 306. In such an example, during threading of the layup material 166, the backing layer separation device 222 moves from the separation device home position 226 (FIG. 12) to the separation device engagement position 228 (FIG. 13) which may be a neutral position 300 as described above. Alternatively during threading of the layup material 166, the backing layer separation device 222 may be moved from the separation device home position 226 to a separation device engagement position 228 that places the backing layer 168 in alignment with a single backing layer separation mechanism (e.g., the first backing layer separation mechanism 250) for engaging the layup material leading edge 174 as the backed material 164 is fed through the lamination head 140 to cause the layup material 166 to be applied to the substrate 118.

In the above-mentioned embodiment of a lamination head 140 having bi-directional layup capability but lacking self-threading capability, the backing layer collection drum 180 may be rotatably fixed in position at the collection drum home position 182 (FIG. 13), and the lamination head 140 may lack a collection drum engagement position 184 (FIG. 7) otherwise required for self-threading capability. Similarly, the cutter platen 342 may be fixed in position at the platen engagement position 346 (FIG. 13), and the lamination head 140 may lack a platen home position 344 (FIG. 12) otherwise required for self-threading capability. In addition, the backing layer separation device 222 comprises a backing layer directional control device 224 (FIG. 13) positioned at the separation device engagement position 228 (FIG. 13), and the lamination head 140 may lack a separation device home position 226 (FIG. 7) otherwise required for self-threading capability.

Figure 14:
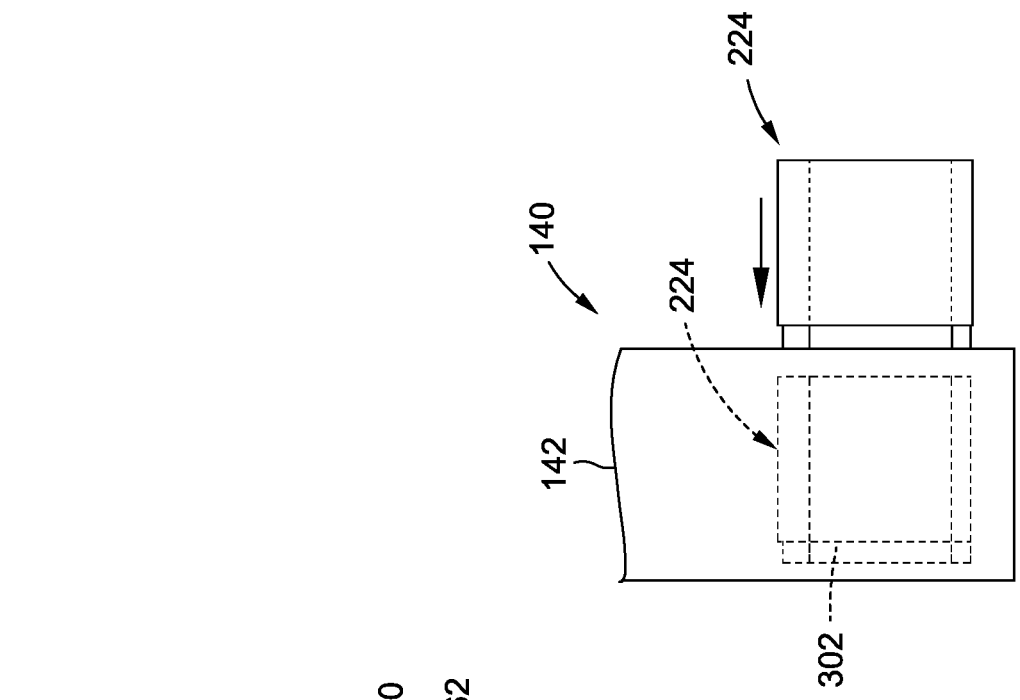
FIG. 14 is a sectional view of the lamination head taken along line 14-14 of FIG. 13 and illustrating the backing layer directional control device moved into a retracted position inside the lamination head.

FIG. 14 is a sectional view of a portion of the lamination head 140 taken along line 14 of FIG. 13 at the location of the backing layer directional control device 224. FIG. 14 shows an example of a lamination head 140 in which the backing layer directional control device 224 is movable from the neutral position 300 in which the backing layer directional control device 224, to a retracted position 302 in which the backing layer directional control device 224 is inside the lamination head 140. The backing layer directional control device 224 may be movable into the retracted position 302 prior to the above-described process of threading the backing layer 168 through the lamination head 140. Advantageously, moving the backing layer directional control device 224 into the retracted position 302 inside the lamination head 140 may provide additional clearance and access to the first backing layer separation mechanism 250 and the second backing layer separation mechanism 270 such as for maintenance purposes.

Figure 15:
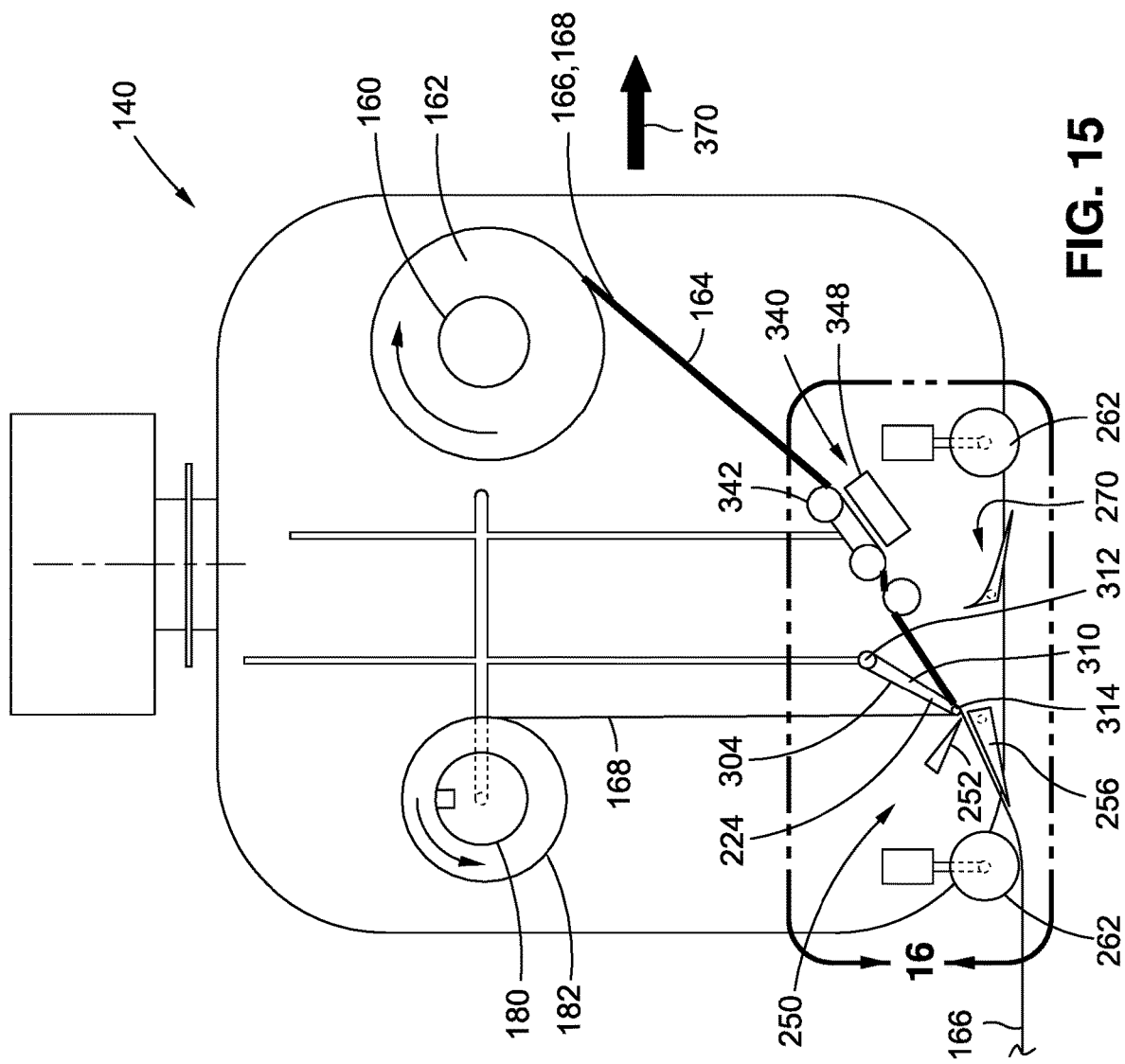
FIG. 15 is a view of the lamination head showing the backing layer directional control device moved from a neutral position to a first mode separation position.
Figure 18:
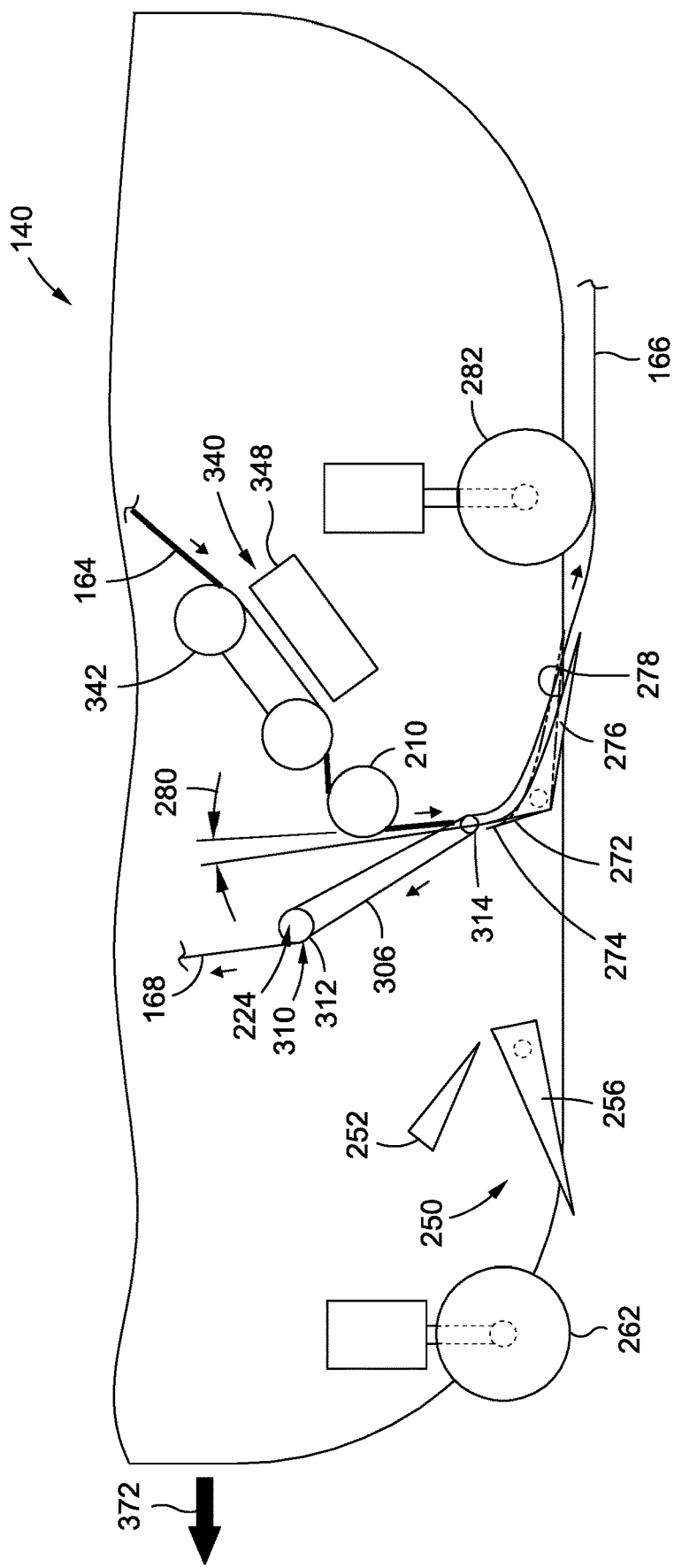
FIG. 18 is a magnified view of the encircled region identified by reference numeral 18 of FIG. 17 and illustrating the backing layer directional control device in the second mode position and aligned with a second backing layer separation mechanism for separating the backing layer from the layup material while the layup material is applied to the substrate as the lamination head moves along a second direction of travel opposite the first direction of travel.

FIG. 15 shows the backing layer directional control device 224 moved from the neutral position 300 (FIG. 13) to the first mode separation position 304. In the example shown, the backing layer directional control device 224 is configured as a pivoting device 310 having a proximal end 312 and a distal end 314. The pivoting device 310 is pivotable about the proximal end 312 to move the distal end 314 between the neutral position 300 (FIG. 13), the first mode separation position 304 (FIGS. 15-16) and the second mode separation position 306 (FIGS. 17-18). When moved into the first mode separation position 304, the distal end 314 of the pivoting device 310 positions the backed material 164 into alignment with the first backing layer separation mechanism 250. Likewise, as shown in FIGS. 17-18 and described below, when moved into the second mode separation position 306, the distal end 314 of the pivoting device 310 positions the backed material 164 into alignment with the second backing layer separation mechanism 270.

Figure 16:
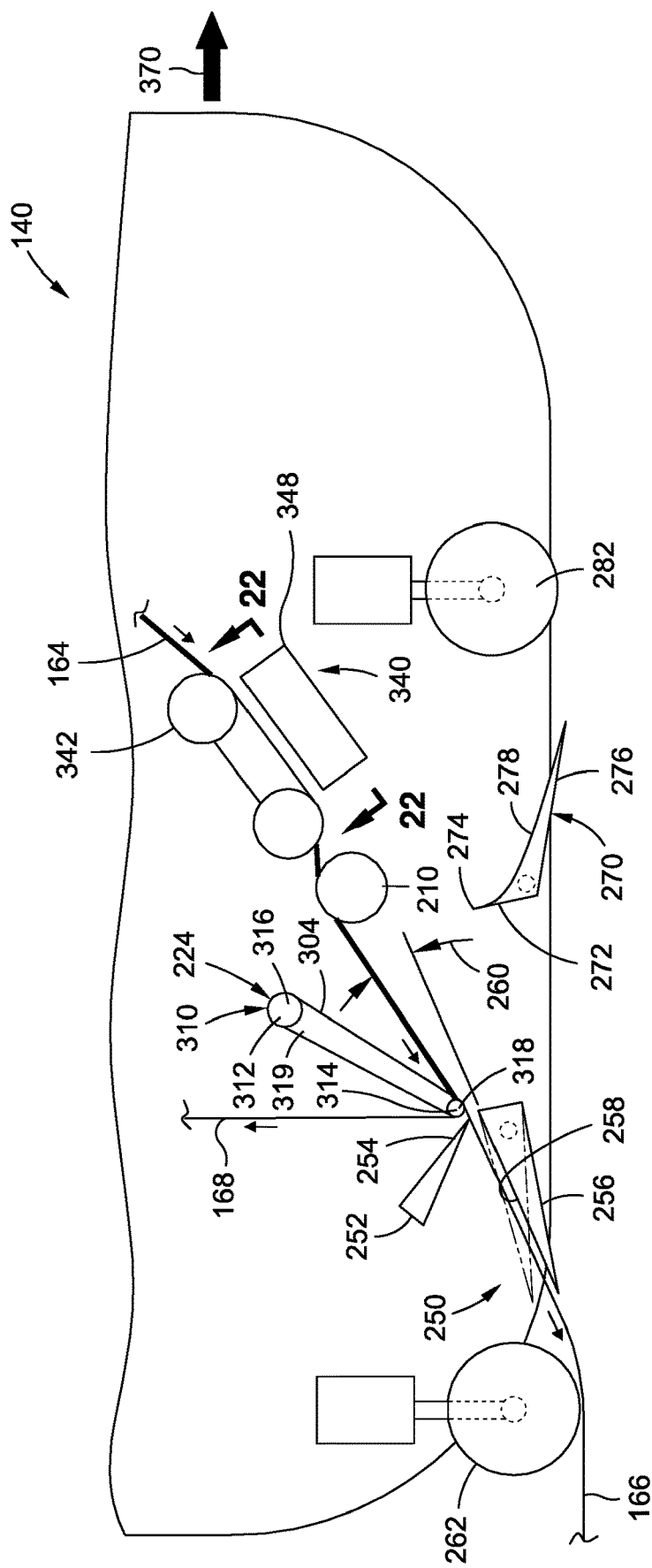
FIG. 16 is a magnified view of the encircled region identified by reference numeral 16 of FIG. 15 and illustrating the backing layer directional control device pivoted into the first mode separation position and aligned with a first backing layer separation mechanism for separating the backing layer from the layup material while the layup material is applied to a substrate as the lamination head moves along a first direction of travel.

Referring to FIG. 16, shown is a magnified view of a lower portion of the lamination head 140 illustrating the pivoting device 310 configured as a roller mechanism having a proximal belt roller 316 and a distal belt roller 318 spaced apart from each other and surrounded by a continuous roller belt 319. The roller belt 319 is configured to circulate around the proximal and distal rollers 316, 318 as the backing layer 168 moves along the roller belt 319. Alternatively, the pivoting device 310 may be formed as a unitary structure in which the distal end 314 has a static surface which the backing layer 168 slides over. Although FIG. 16 shows the backing layer directional control device 224 as a pivoting device 310, the backing layer directional control device 224 may be provided in alternative configurations such as a translating device 320 as described below and illustrated in FIG. 26.

FIG. 16 shows the backing layer directional control device 224 in the first mode separation position 304 and aligned with the first backing layer separation mechanism 250 for separating the backing layer 168 from the layup material 166 for applying the layup material 166 to the substrate 118 as the lamination head 140 moves along a first direction of travel 370. The first backing layer separation mechanism 250 has a first backing layer separator 252 and a first guide member 256. Likewise, FIG. 18 shows the second backing layer separation mechanism 270 having a second backing layer separator 272 and a second guide member 276. The first backing layer separator 252 and the second backing layer separator 272 respectively have a first and second separator edge 254, 274 configured to separate the backing layer 168 from the layup material 166 and guide the layup material 166 toward the substrate 118. The first and second separator edge 254, 274 may be positioned in close proximity to the backed material 164 depending on whether the backing layer directional control device 224 in the first mode separation position 304 (FIG. 16) or the second mode separation position 306 (FIG. 18) for respectively causing the first or second separator edge 254, 274 to engage the layup material leading edge 174 (FIG. 25) as the backed material 164 moves through the lamination head 140. The first guide member 256 has a first guide surface 258 and the second guide member 276 has a second guide surface 278. Each guide surface 258, 278 may be oriented non-perpendicular to the layup material 166 to support the layup material 166 after separation of the layup material 166 from the backing layer 168 and guide the layup material 166 onto the substrate 118. In FIG. 18, the portion of the second separator edge 274 nearest the distal end 314 of the backing layer directional control device 224 is preferably oriented approximately parallel to a tangent to the distal end 314 at the location where the layup material 166 separates from the backing layer 168 as the backing layer 168 moves around the distal end 314.

Referring to FIGS. 16 and 18, in some examples, the first guide member 256 of the first backing layer separation mechanism 250 and/or the second guide member 276 of the second backing layer separation mechanism 270 may be pivotably adjustable for respectively adjusting a first pitch angle 260 (FIG. 16) or a second pitch angle 280 (FIG. 18) respectively of the first guide surface 258 (FIG. 16) and the second guide surface 278 (FIG. 18). The first and second pitch angle 260, 280 respectively of the first and second guide surface 278 is measured relative to the portion of the layup material 166 immediately upstream respectively of the first and second guide member 256, 276. The first and second pitch angle 260, 280 respectively of the first and second guide surface 258, 278 may be larger for a layup material 166 having a relatively high axial stiffness than the first and second pitch angle 260, 280 for a layup material 166 having a relatively low axial stiffness. The axial stiffness of layup material 166 may be primarily a function of the fiber orientation within the layup material. For example, the axial stiffness of layup material 166 having unidirectional reinforcing fibers (not shown) may be higher than the axial stiffness of layup material 166 having woven reinforcing fibers (not shown). The level of adhesion or tack between the layup material 162 and the backing layer 168 may also have a significant impact on the first and second pitch angle 260, 280 respectively selected for the first and second guide surface 278. For example, in FIG. 16, a relatively high level of adhesion between the layup material 162 and the backing layer 168 may result in the layup material 162 separating from the backing layer 168 at a location further downstream on the outer circumference of the distal end 314 of the backing layer directional control device 224, which may dictate a larger first pitch angle 260 for the first guide surface 258 than the pitch angle required for a relatively low level of adhesion between the layup material 162 and the backing layer 168.

In the present disclosure, the portion of the backing layer separation device 222 (e.g., the backing layer directional control device 224) nearest the backing layer 168 may have a relatively small radius. The layup material 166 may have a higher axial stiffness compared to the axial stiffness of the backing layer 168 such that when the backed material 164 moves around the relatively small radius of the backing layer separation device 222, the bond strength between the layup material 166 and the backing layer 168 is exceeded causing the layup material leading edge 174 to peel away from the backing layer 168 and resulting in the layup material 166 separating from the backing layer 168. The first or second separator edge 254, 274 may engage the layup material leading edge 174 without contacting the backing layer 168. The engagement of the first or second separator edge 254, 274 with the layup material leading edge 174 may assist in peeling the layup material 166 away from the backing layer 168 and directing the layup material 166 respectively toward the first or second guide surface 258, 278, depending on whether the backing layer directional control device 224 is in the first mode separation position 304 or the second mode separation position 306.

The cutter blade 350 (FIGS. 21-25) of the cutter module 348 may be configured to cut the layup material 166 preferably without cutting the backing layer 168. The cutter module 348 may be manually pre-adjusted and/or controlled by the controller 130 to cut the backing layer 168. The controller 130 commands the cutter module 348 to cut the layup material 166 in coordination with the approaching start of a new course 178 (FIG. 1) of layup material 166 to be applied to the substrate 118. In addition, the controller 130 commands the cutter module to cut the layup material 166 in coordination with the approaching end of a course 178 of layup material 166 currently being applied to the substrate 118. As mentioned above, the cutting of the layup material 166 by the cutter module 348 creates a layup material leading edge 174 (FIG. 25) and a layup material trailing edge 176 (FIG. 25) which abuts or faces the layup material leading edge 174.

Referring still to FIG. 16, when the lamination head 140 is moving along the first direction of travel 370 and approaches a predetermined location of a start of a new course 178 (FIG. 1) of layup material 166 to be applied to the substrate 118, the first separator edge 254 of the first backing layer separator 252 engages the layup material leading edge 174 and diverts the layup material 166 toward the first guide surface 258 of the first guide member 256 which guides the layup material 166 onto the substrate 118. When the lamination head 140 approaches a predetermined location of the end of the course 178 of layup material 166 while moving along the first direction of travel 370, the cutter module 348 makes another cut (FIG. 25) in the layup material 166. Prior to the cut reaching the first backing layer separator 252, the backing layer directional control device 224 and/or the first backing layer separator 252 may optionally be moved slightly away from the backed material 164 which allows the layup material trailing edge 176 of the cut to continue over the first guide member 256, and also prevents the first separator edge 254 from engaging the layup material leading edge 174 which thereby prevents the layup material 166 located upstream of the layup material leading edge 174 from following the layup material trailing edge 176 over the first guide surface 258 and onto the substrate 118. Instead, a short section (not shown) of layup material 166 located upstream of the layup material leading edge 174 remains adhered to the backing layer 168 and moves with the backing layer 168 toward the backing layer collection drum 180. In anticipation of a new course 178 of layup material 166 being applied to the substrate 118 after the lamination head 140 reverses direction to move along the second direction of travel 372, the cutter module 348 makes another cut (FIG. 25) in the layup material 166, and the backing layer directional control device 224 moves from the first mode separation position 304 as shown in FIG. 16 to the second mode separation position 306 as shown in FIGS. 17-18. The cut that is made in anticipation of the new course defines the layup material trailing edge 176 of the above-mentioned short section of layup material 166 that is ultimately wound with backing layer 168 onto the backing layer collection drum 180. The cut made in anticipation of the new course also defines the layup material leading edge 176 of the new course.

A short section of layup material 166 is ultimately wound onto the backing layer collection drum 180 each time the lamination head 140 reaches the end of a course 178 along the first direction of travel 370 and reverses direction to start a new course 178 along the second direction of travel 372. More specifically, each short section of layup material 166 is generated as a result of the distal end 314 of the backing layer directional control device 224 moving upstream along the backed material 164 from the first mode separation position 304 (e.g., which may define the approximate location of the cut defining the end of a most recent course) to the second mode separation position 306 (e.g., which may define the approximate location of the cut defining the start of a new course) while the backed material 164 is either stopped or continues to move through the lamination head 140 in a normal downstream direction toward the backing layer collection drum 180. In this regard, the length of each short section may be approximately equal to the distance between the distal end 314 of the backing layer directional control device 224 in the first mode separation position 304 and the distal end 314 in the second mode separation position 306. However, if the backed material 164 can be temporarily reversed in direction to move in an upstream direction toward the material supply drum 160 when a cut in the layup material 166 reaches the first mode separation position 304 of the distal end 314, then the layup material leading edge 170 defined by the cut can be moved upstream to the location of the second mode separation position 306 of the distal end 314. Temporarily moving the backed material 164 in an upstream direction to move the layup material leading edge 170 to the second mode separation position 306 allows the second separator edge 274 to engage the layup material leading edge 170 when the backed material is again reversed to move in the normal downstream direction, and thereby directing the layup material 166 onto the second guide member 276 to start a new course 178, and avoiding the generation of the above-mentioned short section of layup material.

Referring to FIG. 17-18, shown is the backing layer directional control device 224 in the second mode separation position 306. In the example shown, the second guide member 276 and the second backing layer separator 272 are formed as a unitary structure. However, the second guide member 276 and the second backing layer separator 272 may be separate components similar to the separate arrangement of the first guide member 256 and first backing layer separator 252. As shown in FIG. 18, the second backing layer separator 272 is located adjacent to the backing layer 168 and the second guide member 276 is located downstream of the second backing layer separator 272. The second guide surface 278 of the second guide member 276 may be curved for redirecting the layup material 166 into the appropriate orientation for being applied to the substrate 118 as the lamination head 140 moves along the second direction of travel 372 opposite the first direction of travel 370 (FIGS. 15-16). As described above, the unitary structure of the second guide member 276 and second backing layer separator 272 may be pivotably adjustable for adjusting a second pitch angle 280 of the second guide surface 278 based upon the axial stiffness of the layup material 166 and the level of adhesion between the layup material 166 and the backing layer 168.

In FIG. 18, shown is a magnified view of the lower portion of the lamination head 140 illustrating the backing layer directional control device 224 aligned with the second backing layer separation mechanism 270 for separating the backing layer 168 from the layup material 166 while the layup material 166 is applied to the substrate 118 as the lamination head 140 moves along the second direction of travel 372. As mentioned above, as the backed material 164 moves around the relatively small radius of the backing layer directional control device 224, the second separator edge 274 of the second backing layer separator 272 engages the layup material leading edge 174 as the layup material leading edge 174 peels away from the backing layer 168. The second backing layer separator 272 directs the layup material 166 toward the second guide surface 278 of the second guide member 276 which guides the layup material 166 onto the substrate 118 while the lamination head 140 moves along the second direction of travel 372.

As described above with regard to FIG. 16, when the lamination head 140 approaches a predetermined location of the end of the course 178 of layup material 166 while moving along the second direction of travel 372, the cutter module 348 cuts the layup material 166 to form a layup material trailing edge 176 (FIG. 25) for the currently applied course 178 of layup material 166. Prior to the cut reaching the second backing layer separator 272, the backing layer directional control device 224 and/or the second backing layer separator 272 (and second guide member 276) may be moved slightly away from the backed material 164 to allow the layup material trailing edge 176 to continue over the second guide member 276, and thereby prevent the second separator edge 274 of the second backing layer separator 272 from engaging the layup material leading edge 174.

As shown in FIGS. 15-19, the lamination head 140 may include a first compaction device 262 located downstream of the first guide member 256. The first compaction device 262 may apply compaction pressure onto the layup material 166 against the substrate 118 as the lamination head 140 moves along the first direction of travel 370. The lamination head 140 may also include a second compaction device 282 located downstream (relative to the feed direction of the layup material 166) of the second guide member 276. The second compaction device 282 may apply compaction pressure onto the layup material 166 as the lamination head 140 moves along the second direction of travel 372. The first compaction device 262 and/or the second compaction device 282 may be provided in any one a variety of configurations including, but not limited to, a compaction roller, a compaction shoe, a compaction bladder or other configurations for compacting the layup material 166 onto the substrate 118.

The lamination head 140 may also include one or more redirect rollers 210 to maintain tension in the backed material 164 during the application of layup material 166 to the substrate 118. The one or more redirect rollers 210 may maintain tension in the backed material 164 while accommodating movement of the backing layer directional control device 224 between the first mode separation position 304, the neutral position 300, and the second mode separation position 306. The lamination head 140 may include additional components such as one or more heaters (not shown) such as an infrared heater, a laser heater, or a hot air heater for locally heating the layup material 166 and/or locally heating the substrate 118 just prior to application of the layup material 166 onto the substrate 118. Local heating of the layup material 166 and/or the substrate 118 may increase the tack of the layup material 166 to thereby improve the adhesion of the layup material 166 to the substrate 118.

Figure 19:
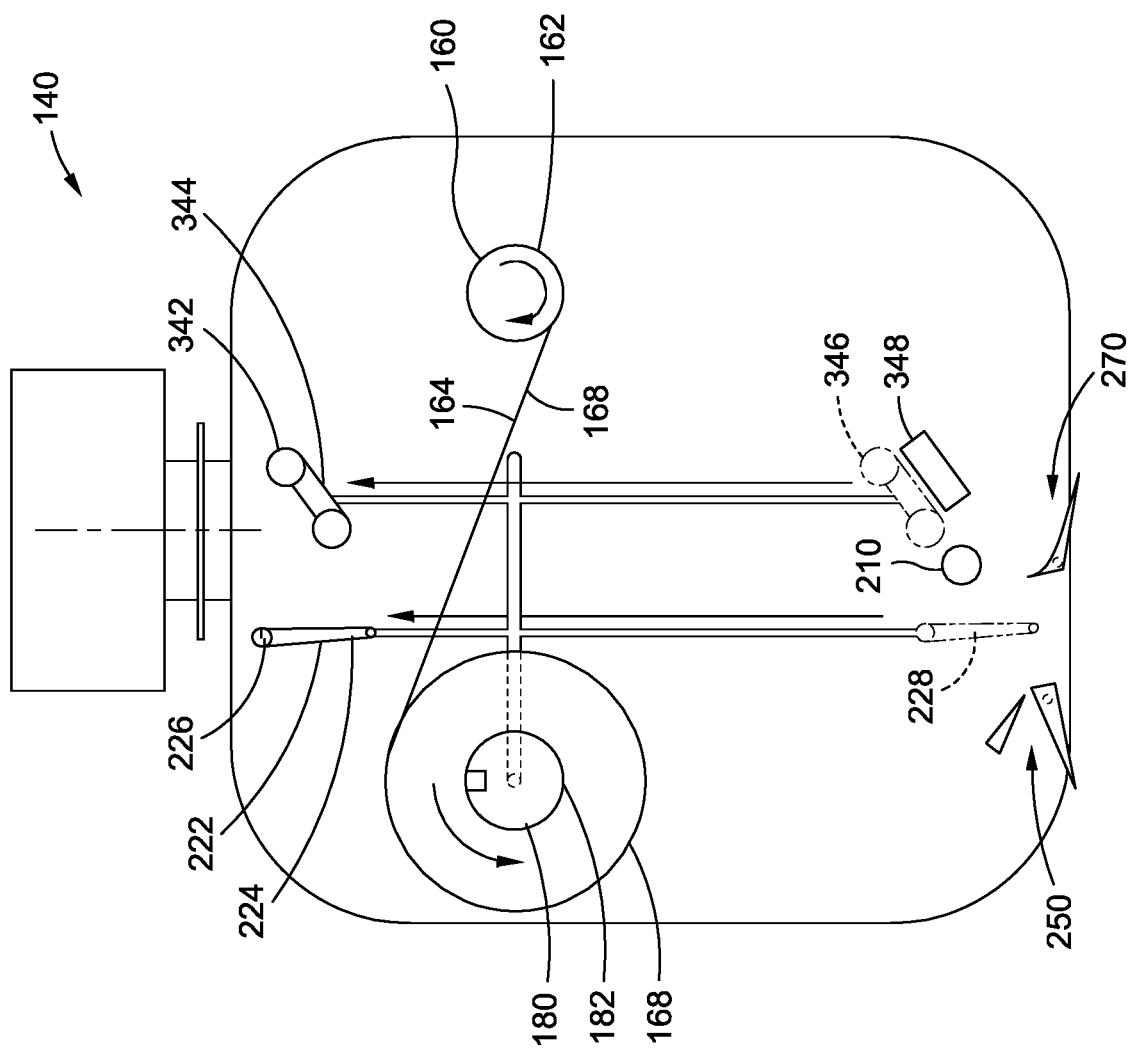
FIG. 19 is a view of the lamination head showing the backing layer directional control device moved back to the separation device home position and illustrating the cutter platen moved from back to the platen home position and further illustrating the backing material extending between a depleted material roll and the backing layer collection drum.

Referring to FIG. 19, shown is the backing layer separation device 222 which is configured to move (e.g., translate), under control of the controller 130, from the separation device engagement position 228 (FIG. 18) to the separation device home position 226 (FIG. 19) after the material roll 162 on the material supply drum 160 is, for example, depleted of layup material 166 (FIG. 12). However, a material roll 162 may be replaced of any number of reasons, including changing out a material roll 162 for a material roll 162 of a different material configuration, or changing out a material roll 162 upon exceeding its allotted outtime, or if the remaining length of layup material 166 on the material roll 162 is insufficient to enable the lamination head 140 to apply the layup material 166 onto the substrate 118. The cutter platen 342 is configured to move (e.g., translate), under control of the controller 130, from the platen engagement position 346 (FIG. 18) to the platen home position 344 (FIG. 19) either simultaneously with the movement of the backing layer separation device 222 and/or before or after movement of the backing layer separation device 222 to the separation device home position 226. Also shown is a lengthwise portion of either backing layer 168 or backed material 164 (i.e., layup material 166 backed by backing layer 168) extending between the material roll 162 (depleted) and the backing layer collection drum 180 which may predominantly contain backing layer 168. The controller 130 may rotate the backing layer collection drum 180 and the material supply drum 160 in a manner to maintain tension within the length of backed material 164 extending between the backing layer collection drum 180 and the material supply drum 160 as the backing layer separation device 222 and the cutter platen 342 moved respectively back to the separation device home position 226 and platen home position 344.

Figure 20:
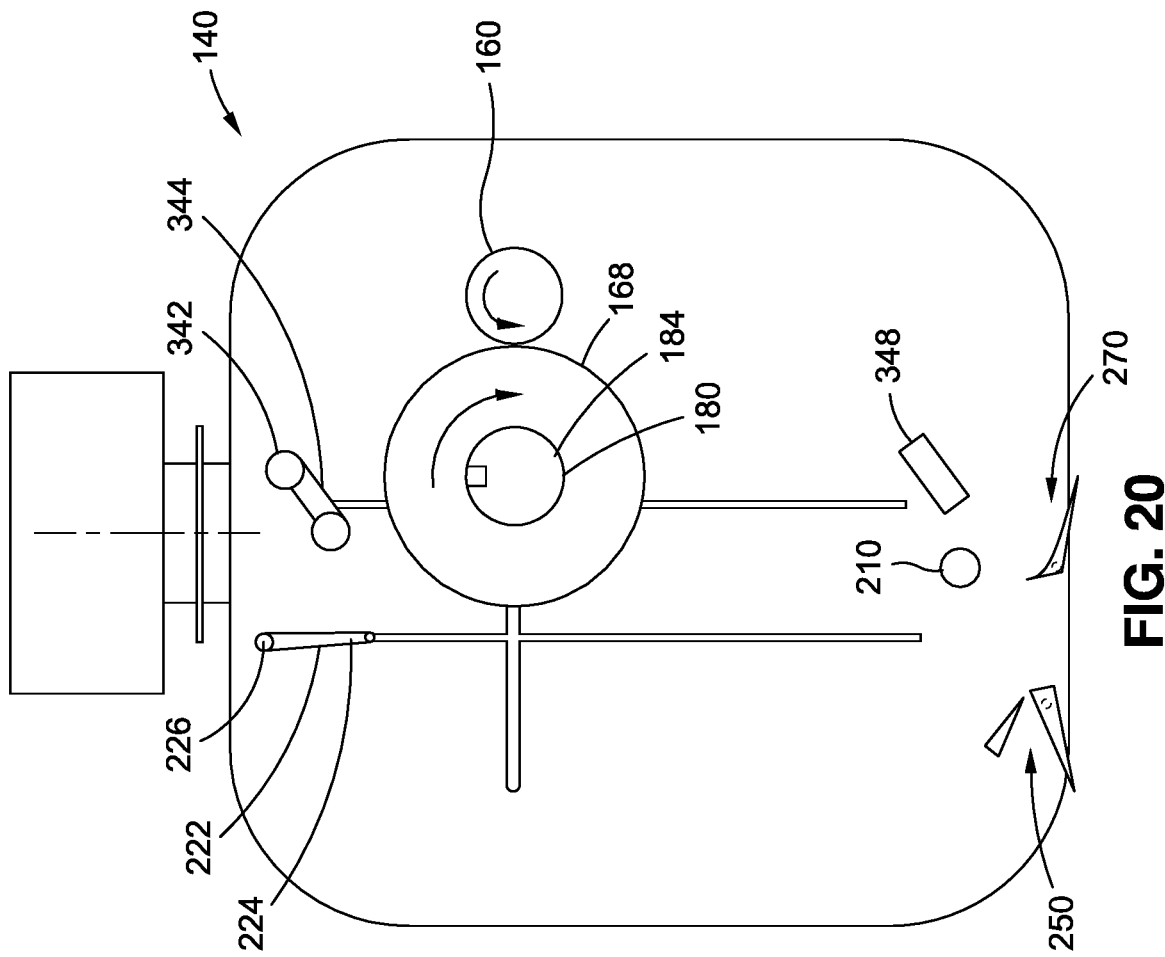
FIG. 20 is a view of the lamination head showing the backing layer collection drum moved from the collection drum home position to the collection drum engagement position for winding the backing layer onto the depleted material roll mounted on the material supply drum.

As shown in FIG. 20, the backing layer collection drum 180 is configured to move (e.g., translate) from the collection drum home position 182 to the collection drum engagement position 184 proximate the material supply drum 160 to enable transferring or respooling of the backing layer 168 (predominantly) from the backing layer collection drum 180 to the material supply drum 160. During movement of the backing layer collection drum 180 to the collection drum engagement position 184, the controller 130 may control the rotation of the material supply drum 160 and the backing layer collection drum 180 in a manner to avoid the buildup of slack in the lengthwise portion of the backing layer 168 or backed material 164. The controller 130 may control the rotation of the backing layer collection drum 180 and material supply drum 160 to wind or respool the backing layer 168 from the backing layer collection drum onto the material supply drum 160.

As shown in FIG. 21, after the backing layer 168 is wound or respooled onto the material supply drum 160, the backing layer collection drum 180 is configured to move, under command of the controller 130, from the collection drum engagement position 184 (FIG. 20) back to the collection drum home position 182. The material roll 162 containing primarily backing layer 168 may then be removed from the material supply drum 160 and replaced with a new material roll 162 of the same or different backed material 164. Removal and replacement of a material roll 162 may be manually performed by an operator or technician. Alternatively, removal and replacement of a material roll 162 may be autonomously performed (i.e., without human intervention) by a material reloading system (not shown) that may be included with the manufacturing system 100 (FIGS. 2-3). As an alternative to winding or respooling the backing layer 168 onto the material supply drum 160, the backing layer collection drum 180 may remain in the collection drum home position 182 after depletion of the material roll 162, and the roll of backing layer 168 may be manually or autonomously removed from the backing layer collection drum 180. A new material roll 162 may then be loaded onto the material supply drum 160 and the lamination head 140 may be prompted for self-threading as described above.

Referring to FIGS. 22-25, shown is the progression of a cut being formed in the layup material 166 as the backed material 164 moves at a material feed rate 360 through the cutter assembly 340. FIG. 22 is a view of the cutter platen 342 showing an example of a cutter blade 350 at a start location of an intended cut line 358 prior to the cutter blade 350 moving across the backed material 164 along a blade path angle 352. As mentioned above, the cutter module 348 may include one or more cutter blades 350 for cutting the layup material 166 as the backing layer 168 slides along the surface of the cutter platen 342. Movement of the cutter blade 350 may be controlled by the controller 130. In an embodiment not shown, the cutter module 348 may be configured to move at least one cutter blade 350 along at least two axes (not shown) for forming complex cuts (e.g., non-straight cuts) in the layup material 166 as the backed material 164 moves through the cutter assembly 340. For example, instead of limiting movement of the cutter blade 350 to straight-line movement as shown in FIGS. 22-25, the cutter module 348 may be configured to pivot the cutter blade 350 while moving the cutter blade 350 across the width of the backed material 164.

FIGS. 23-24 shows the cutter blade 350 moving along the blade path angle 352 at a blade speed defining a blade travel vector 354 for cutting the layup material 166 along the intended cut line 358. The cutter blade 350 moves across the material width at a blade travel vector 354 having a longitudinal component 356 that is parallel to the lengthwise direction of the backed material 164. The longitudinal component 356 of the blade travel vector 354 is proportional to the material feed rate 360.

FIG. 25 shows the cut formed in the layup along the intended cut line 358. The depth of the cutter blade 350 is controlled such that the backing layer 168 may remain at least partially intact during the cutting of the layup material 166. In the example shown, the intended cut line 358 is oriented perpendicular to the lengthwise direction of the backed material 164. For an intended cut line 358 oriented perpendicular to the lengthwise direction of the backed material 164, the longitudinal component 356 of the blade travel vector 354 is equivalent to the material feed rate 360. For an intended cut line 358 oriented non-perpendicular (not shown) to the lengthwise direction of the backed material 164, the longitudinal component 356 of the blade travel vector 354 is either less than or greater than the material feed rate 360. Advantageously, moving the cutter blade 350 along the above-described blade travel vector 354 enables the layup material 166 to be cut without stopping the application of layup material 166 to the substrate 118. In this regard, cutting the layup material 166 while the lamination head 140 continues to apply layup material 166 to the substrate 118 increases the production rate relative to a conventional lamination head (not shown) that must temporarily stop laying up layup material 166 each time it is necessary to make a cut in the layup material 166. However, it should also be noted that the lamination head 140 may be configured to temporarily slow or stop the dispensing of layup material 166 if needed to allow the cutter assembly 340 such as to form complex cuts (not shown) in the layup material 166.

Figure 26:
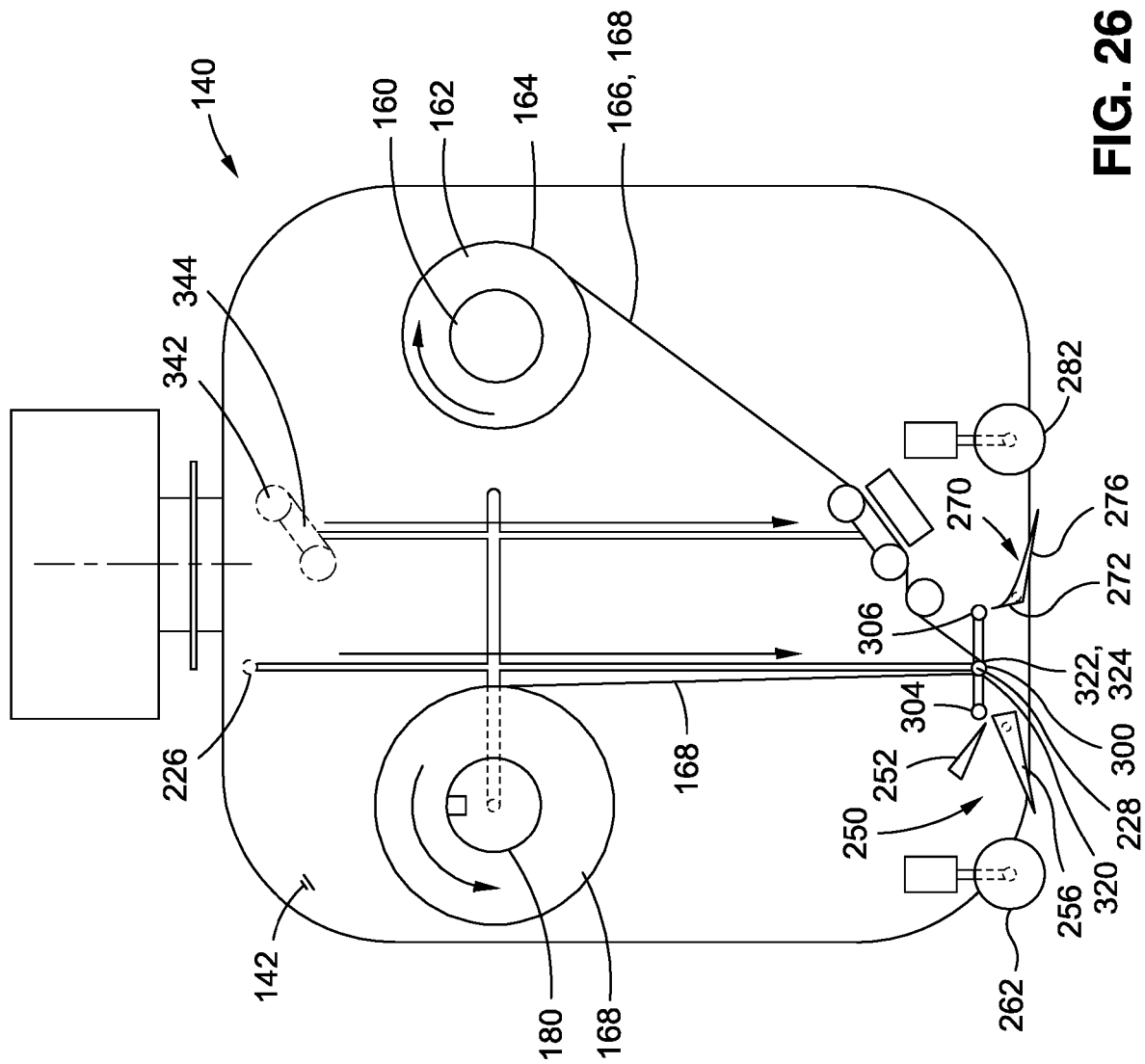
FIG. 26 is a view of end example of the lamination head in which the backing layer directional control device is configured as a translating device movable between the neutral position, the first mode separation position, and the second mode separation position.

Referring to FIG. 26, shown is an example of a lamination head 140 in which the backing layer directional control device 224 is configured as a translating device 320 that is movable between the neutral position 300, the first mode separation position 304, and the second mode separation position 306. The translating device 320 may be configured to translate along a linear path and/or along an arcuate path between the neutral position 300, the first mode separation position 304 and the second mode separation position 306. Movement of the translating device 320 between the neutral position 300, the first mode separation position 304, and the second mode separation position 306 may be facilitated by a linear motion mechanism (not shown) such as a screw drive that is rotatable via a servo motor controlled by the controller 130 in the manner described above with regard to the above-described pivoting device 310 illustrated in FIGS. 15-18.

In FIG. 26, the translating device 320 may be provided as a stub 322 geometrically configured as a wedge, a cylinder, or a post. The stub 322 may have a non-movable outer surface which may be a low-friction surface such as a smooth or polished surface enabling the backing layer 168 to slide over the outer surface as the backing layer 168 is fed through the lamination head 140. In an alternative embodiment, the stub 322 may be configured as a roller configured to freely rotate about a roller axis (not shown) as the backing layer 168 moves around the roller. As may be appreciated, the translating device 320 may be provided in a wide variety of different sizes and shapes. Regardless of the configuration, the translating device 320 may have a relatively small radius that may be sized based on the axial stiffness of the layup material 166 and/or based on the level of adhesion between the layup material 166 and the backing layer 168. In this regard, the translating device 320 may be sized to cause the layup material leading edge 174 to peel away from the backing layer 168 under the urging of the first or second separator edge 254, 264 for respectively of the first backing layer separator 252 or second backing layer separator 272, as described above with regard to the pivoting device 310 shown in FIGS. 15-18.

Figure 27:
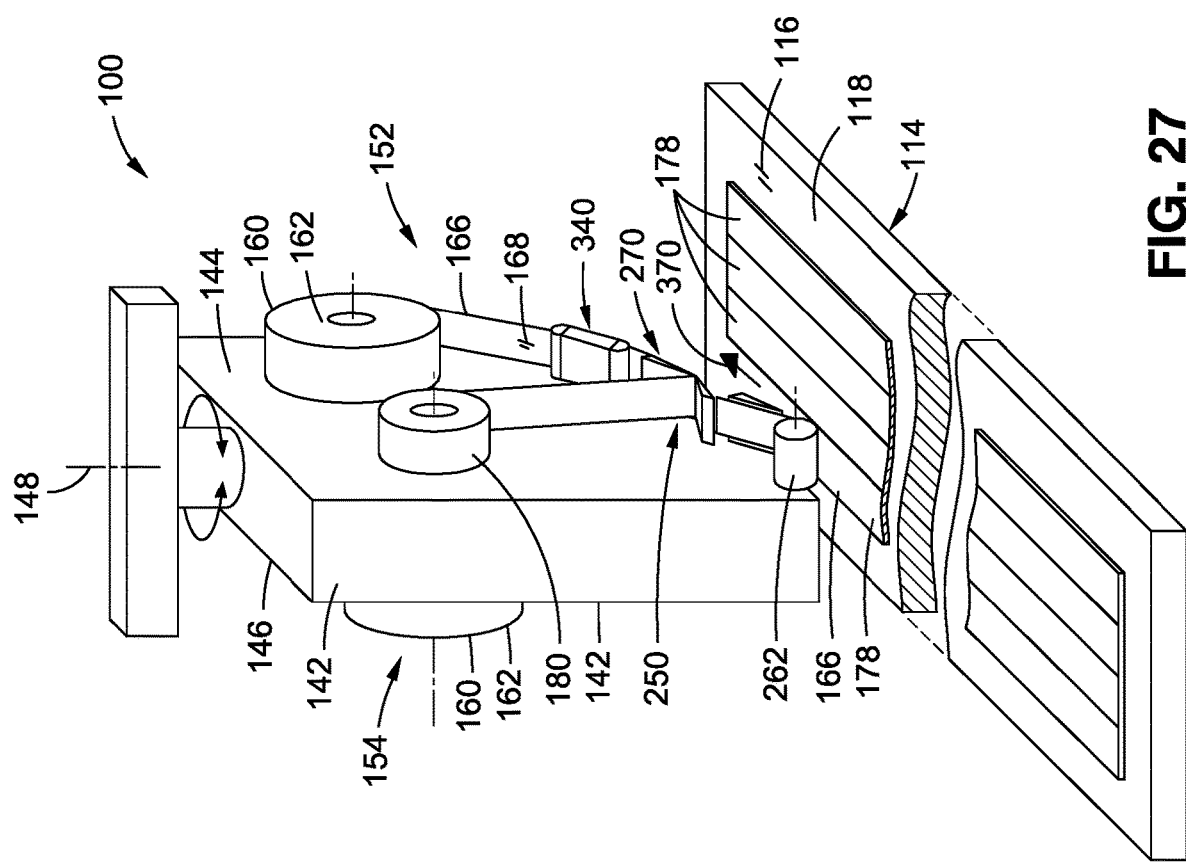
FIG. 27 is a perspective view of an example of a lamination head having a first lamination assembly mounted on a first side of the mounting frame and a second lamination assembly mounted on a second side of the mounting frame which is pivotable about a vertical axis to allow the first lamination assembly to apply layup material to a substrate along a first direction of travel and allow the second lamination assembly to apply layup material to the substrate along a second direction of travel.

FIG. 27 shows an example of a lamination head 140 having a mounting frame 142 having a first side 144 and a second side 146 located opposite the first side 144. The lamination head 140 includes a first lamination assembly 152 mounted on the first side 144 of the mounting frame 142 and a second lamination assembly 154 mounted on the second side 146 of the mounting frame 142. The first lamination assembly 152 includes the above-described head components for applying layup material 166 to a substrate 118, including a material supply drum 160, a backing layer collection drum 180, and a backing layer separation assembly 220. The first lamination assembly 152 may additionally include a cutter assembly 340, redirect rollers 210, and other lamination head components. The second lamination assembly 154 may have substantially the same arrangement of head components as the first lamination assembly 152, at least including the material supply drum 160, the backing layer collection drum 180, and the backing layer separation assembly 220.

In FIG. 27, the mounting frame 142 may be pivotable about a vertical axis 148 to allow the first lamination assembly 152 to be available for applying layup material 166 to the substrate 118 while the second lamination assembly 154 is available (e.g., physically accessible) for replacing or changing out the material roll 162 of the second lamination assembly 154. For example, prior to moving the lamination head 140 or dispensing layup material 166 from the first lamination assembly 152, the material roll 162 of the second lamination assembly 154 may be available for manual or autonomous replacement, as described above. Alternatively, the mounting frame 142 may be pivoted about the vertical axis 148 such that the second lamination assembly 154 is available to dispense layup material 166 while the first lamination assembly 152 is available for manual or autonomous changeout or replacement of the material roll 162 of the first lamination assembly 152. The ability to pivot the mounting frame 142 of a lamination head about a vertical axis 148 for making the first or second lamination assembly 152, 154 available for dispensing layup material 166 while the remaining first or second lamination assembly 152, 154 is available for replacement of the material roll 162 may avoid the cost and complexity associated with dual lamination heads (not shown) in which one lamination head is available for dispensing layup material while the other lamination head is reloaded with a new or different material roll.

Figure 28:
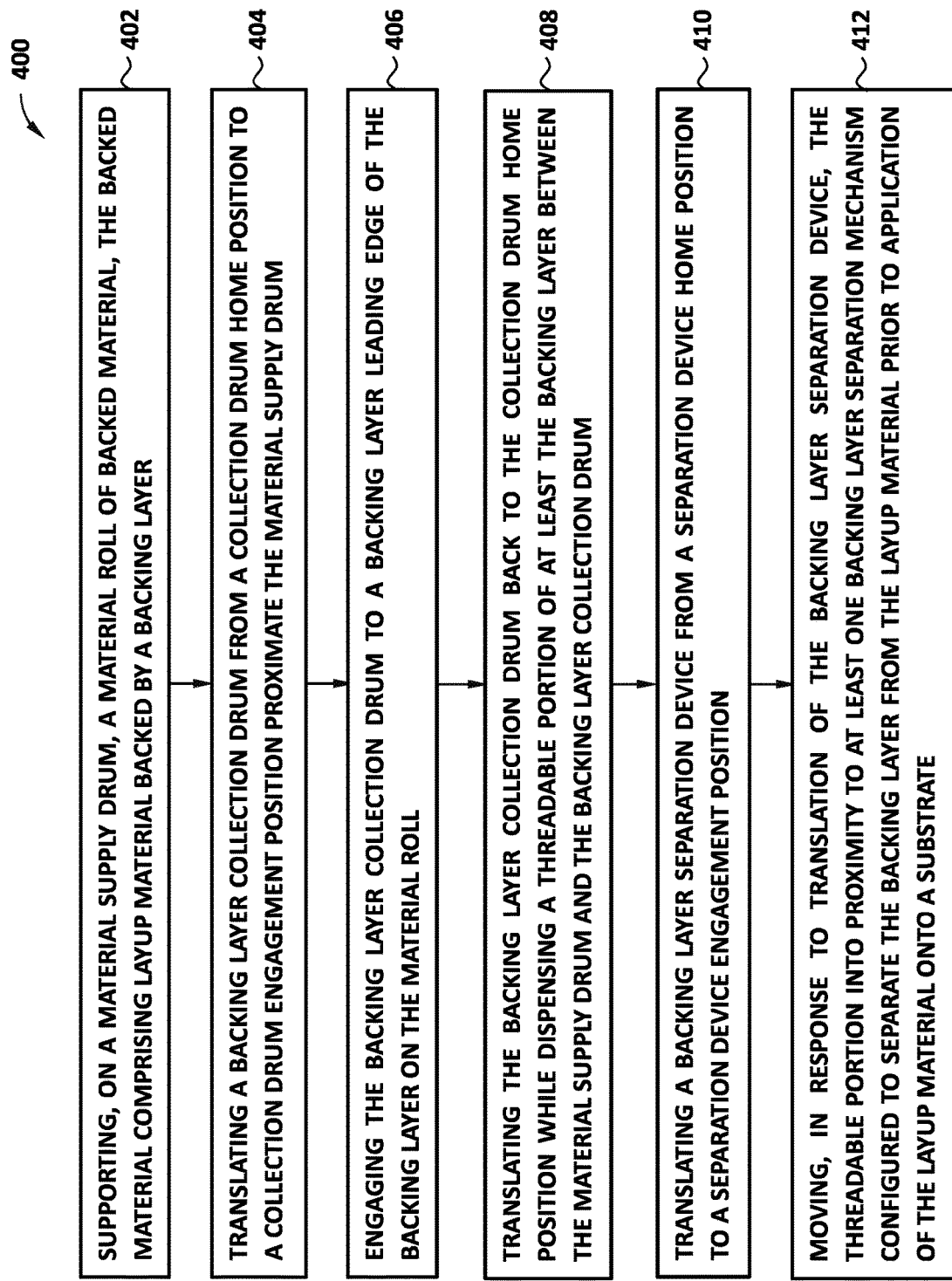
FIG. 28 is a flowchart of operations included in a method of threading layup material through a lamination head.

FIG. 28 is a flowchart of operations included in a method 400 of threading layup material 166 in a lamination head 140 configured to support a material supply drum 160. Step 402 of the method 400 includes supporting, on the material supply drum 160, a material roll 162 of backed material 164 as shown in FIG. 6. As described above, the backed material 164 comprises layup material 166 backed by a backing layer 168. As also mentioned above, the outermost wraps of the material roll 162 are typically comprised of backing layer 168 only (i.e., a backing-layer-only portion) without any layup material 166. The backing-layer-only portion may be self-threaded through the lamination head as described below. However, a material roll 162 may be provided without a backing-layer-only portion, in which case the backed material 164 (e.g., layup material 166 backed by a backing layer 168) may be self-threaded through the lamination head 140 in the same manner as described below for a material roll 162 having a backing-layer-only portion.

Step 404 of the method 400 includes translating a backing layer collection drum 180 from a collection drum home position 182 to a collection drum engagement position 184 proximate the material supply drum 160 as shown in FIG. 6-7. As described above, the backing layer collection drum 180 may be moved by a linear actuation mechanism (not shown) under command of a controller 130 of the lamination head 140.

Step 406 of the method 400 includes engaging the backing layer collection drum 180 with a backing layer leading edge 170 of the backing layer 168 on the material roll 162. As described above, the outermost wraps on the material roll 162 may be comprised primarily of backing layer 168 only (e.g., a backing-layer-only portion) without any layup material 166 on the backing layer 168. Alternatively, as mentioned above, the outermost wraps on a material roll 162 may be comprised of backed material 164 (e.g., layup material 166 backed by a backing layer 168). Regardless of the configuration of the outermost wraps of the material roll 162, the step of engaging the backing layer collection drum 180 with the backing layer leading edge 170 may comprise engaging a backing layer pick element 190 of the backing layer collection drum 180 to the backing layer leading edge 170 on the material roll 162 as shown in FIG. 7. The method may further include pulling, using the backing layer collection drum 180, the backing layer leading edge 170 away from the material supply drum 160 when translating the backing layer collection drum 180 to the collection drum engagement position 184, as shown in FIG. 12.

Referring briefly to FIGS. 8-11, the process of engaging the backing layer pick element 190 with the backing layer leading edge 170 may be performed by any one a variety of different options. For example, engaging the backing layer pick element 190 with the backing layer leading edge 170 may be performed by magnetically coupling a magnet 192 on the backing layer collection drum 180 to a magnetic element 194 mounted on the backing layer leading edge 170 as shown in FIG. 8. In another example, the backing layer pick element 190 may be a vacuum nozzle 198 configured for vacuum attachment to an outer surface of the backing layer leading edge 170 as shown in FIG. 10. In a still further example, engagement of the backing layer pick element 190 with the backing layer leading edge 170 may be performed by engaging a hook element 202 on the backing layer collection drum 180 to a loop element 204 mounted on the backing layer leading edge 170, for engaging a loop element 204 on the backing layer collection drum 180 to a hook element 202 mounted on the backing layer leading edge 170 as shown in FIG. 11.

Step 408 of the method 400 includes translating the backing layer collection drum 180 back to the collection drum home position 182 while dispensing a threadable portion 172 of at least the backing layer 168 between the material supply drum 160 and the backing layer collection drum 180 as shown in FIG. 12. During translation of the backing layer collection drum 180 to the collection drum home position 182, the controller 130 may control the rotation of the material supply drum 160 and the backing layer collection drum 180 to maintain a predetermined level of tension within the threadable portion 172 extending between the backing layer collection drum 180 and the material supply drum 160.

Step 410 of the method 400 includes translating a backing layer separation device 222 from a separation device home position 226 to a separation device engagement position 228. For embodiments of the lamination head 140 having bi-directional layup capability as described above, the backing layer separation device 222 may be configured as a backing layer directional control device 224 (FIG. 7) which is configured to facilitate separation of the layup material 166 from the backing layer 168 in both a first mode separation position 304 (FIG. 15) and in a second mode separation position 306 (FIG. 17) as described above.

Step 412 of the method 400 includes moving the threadable portion 172 into proximity to a backing layer separation mechanism as shown in FIG. 13. As described above, the lamination head 140 includes at least one backing layer separation mechanism configured to separate the backing layer 168 from the layup material 166 prior to application of the layup material 166 onto a substrate 118. For example, the figures illustrate the lamination head 140 having a first backing layer separation mechanism 250 and a second backing layer separation mechanism 270 for embodiments of the lamination head 140 having bi-directional layup capability. However, as indicated above, the lamination head 140 may be provided in an embodiment having a single backing layer separation mechanism (e.g., a first backing layer separation mechanism 250).

The step 412 of moving the threadable portion 172 into proximity to at least one backing layer separation mechanism (e.g., the first backing layer separation mechanism 250 or the second backing layer separation mechanism 270) may include moving the threadable portion 172 into alignment with a backing layer separator and a guide member of the backing layer separation mechanism (e.g., FIG. 15). In addition, step 412 may include separating the backing layer 168 from the layup material 166 using a separator edge positioned in close proximity to the backed material 164, and guiding the layup material 166 onto the substrate 118 using a guide surface of a guide member, as shown in FIG. 16.

Referring to FIG. 12, as part of the threading process, the method 400 may include translating a cutter platen 342 from a platen home position 344 to a platen engagement position 346 before, during or after translation of the backing layer separation device 222 from the separation device home position 226 to the separation device engagement position 228. As described above, the method may include moving, in response to translation of the cutter platen 342, the threadable portion 172 into engagement with the cutter module 348 to allow for cutting of the layup material 166 during application onto the substrate 118. As described above, the cutter assembly 340 may cut the layup material 166 while leaving the backing layer 168 intact as the backed material 164 passes through the cutter assembly 340.

Referring briefly to FIGS. 22-25, the method 400 may include cutting the layup material 166 as the backed material 164 moves through the cutter assembly 340 as a means to reduce lamination head downtime. For example, the method may include moving a cutter blade 350 across the layup material 166 along a blade travel vector 354 having a longitudinal component 356 that is proportional to the material feed rate 360 at which the backed material 164 passes through the cutter assembly 340. To form an intended cut line 358 that is oriented perpendicular (FIG. 25) to the lengthwise direction of the backed material 164, the cutter blade 350 may be moved at a blade travel vector 354 having a longitudinal component 356 that is equivalent to the material feed rate 360. For an intended cut line 358 oriented non-perpendicular (not shown) to the lengthwise direction of the backed material 164, the cutter blade 350 may be moved along a blade travel vector 354 having a longitudinal component 356 that is either less than or greater than the material feed rate 360.

As mentioned above, the lamination head 140 has at least one backing layer separation assembly 220 which includes a backing layer separator (e.g., a first backing layer separator 252 and/or a second backing layer separator 272) and a guide member (e.g., a first guide member 256 and/or a second guide member 276). In some examples, the method 400 may include adjusting the orientation of the first guide member 256 and/or a second guide member 276 in a manner to respectively adjust a pitch angle 260, 280 respectively of the guide surface 258, 278. As described above and shown in FIG. 16, the first and pitch angle 260, 280 may be measured relative to a portion of the layup material 166 immediately upstream respectively of the first and second guide member 256, 276. To allow the layup material leading edge 174 to pass onto the first or second guide surface 258, 278 respectively of the first or second guide member 256, 276 without kinking or bending of the layup material 166, the first or second pitch angle 260, 280 may be adjusted based upon the axial stiffness of the layup material 166. For example, the first or second guide member 256, 276 may be pivotably adjusted such that the respective first or second guide surface 258, 278 is oriented respectively at a first or second pitch angle 260, 280 that is larger for a layup material 166 having a relatively high axial stiffness (e.g., unidirectional prepreg tape) than the first or second pitch angle 260, 280 for a layup material 166 having relatively low axial stiffness (e.g., woven cloth prepreg tape). As shown in FIGS. 16 and 18, a lamination head 140 having bi-directional layup capability includes a first backing layer separation mechanism 250 having has a first backing layer separator 252 and a first guide member 256, and the lamination head 140 also has a second backing layer separation mechanism 270 having a second backing layer separator 272 and a second guide member 276. The first guide member 256 and/or the second guide member 276 may be pivotably adjusted such that the respective first guide surface 258 and second guide surface 278 is complementary to the axial stiffness of the layup material 166.

For a lamination head 140 having bi-directional layup capability, the backing layer separation device 222 is configured as a backing layer directional control device 224 as mentioned above. In such example, the method 400 may include moving the backing layer directional control device 224 between a first mode separation position 304 (FIGS. 15-16) and a second mode separation position 306 (FIG. 17-18. When the backing layer directional control device 224 is in the first mode separation position 304, the method includes separating the backing layer 168 from the layup material 166 while the layup material 166 is applied to the substrate 118 as the lamination head 140 moves along the first direction of travel 370 (FIG. 16). When the backing layer directional control device 224 is in the second mode separation position 306, the method 400 includes separating the backing layer 168 from the layup material 166 while the layup material 166 is applied to the substrate 118 as the lamination head 140 moves along the second direction of travel 372 opposite the first direction of travel 370 (FIG. 18).

In some examples, the method 400 may include moving the backing layer directional control device 224 between a neutral position 300 (FIG. 13), the first mode separation position 304 (FIG. 15) and the second mode separation position 306 (FIG. 17). As shown in FIG. 13, the neutral position 300 may be located between the first mode separation position 304 and the second mode separation position 306. As mentioned above, the first backing layer separation mechanism 250 and the second backing layer separation mechanism 270 may each be incapable of separating the layup material 166 from the backing layer 168 when the backing layer directional control device 224 is in the neutral position 300. Advantageously, the neutral position 300 may provide clearance and access to the first backing layer separation mechanism 250 and the second backing layer separation mechanism 270 such as for maintenance.

Referring briefly to FIGS. 19-21, when the material roll 162 on the material supply drum 160 is depleted of layup material 166, the method 400 may include translating the backing layer separation device 222 (e.g., the backing layer directional control device 224) from the separation device engagement position 228 back to the separation device home position 226 as shown in FIG. 19. In addition, the method may include translating the cutter platen 342 from the platen engagement position 346 to the platen home position 344 as is also shown in FIG. 19. The controller 130 may be operated to rotate the material supply drum 160 and the backing layer collection drum 180 in a manner to maintain a predetermined level of tension within a lengthwise portion of at least the backing layer 168 extending between the backing layer collection drum 180 and the material supply drum 160 as shown in FIG. 19.

The method 400 may include translating the backing layer collection drum 180 from the collection drum home position 182 (FIG. 19) to the collection drum engagement position 184 proximate the material supply drum 160 as shown in FIG. 20, in response to the material supply drum 160 being depleted of backed material 164. The method may additionally include winding the backing layer 168 onto the material supply drum 160 during synchronized rotation of the material supply drum 160 and backing layer collection drum 180 as shown in FIG. 21. After the backing layer 168 is wound onto the material supply drum 160, the method 400 may include translating the backing layer collection drum 180 back to the collection drum home position 182 as shown in FIG. 21, after which the method may include removing the material roll 162 (containing backing layer 168 only) from the material supply drum 160 for possible replacement with a new or different material roll 162.

Referring briefly to FIG. 27, the lamination head 140 may optionally include a mounting frame 142 having a first lamination assembly 152 mounted to a first side 144 of the mounting frame 142 and a second lamination assembly 154 mounted to a second side 146 of the mounting frame 142 opposite the first side 144. As mentioned above, the first lamination assembly 152 and the second lamination assembly 154 may each include at least a material supply drum 160, a backing layer collection drum 180, and a backing layer separation assembly 220. In such example, the method 400 may include applying layup material 166 to the substrate 118 using the first lamination assembly 152, pivoting the mounting frame 142 about a vertical axis 148, and applying layup material 166 to the substrate 118 using the second lamination assembly 154. When the first lamination assembly 152 is available for applying or dispensing layup material 166, the second lamination assembly 154 is available for replacing the material roll 162 on the second lamination assembly 154. Conversely, when the second lamination assembly 154 is available for applying or dispensing layup material 166, the first lamination assembly 152 is available for replacing the material roll 162 on the first lamination assembly 152. As mentioned above, the ability to pivot the lamination head 140 about a vertical axis 148 for making the first lamination assembly 152 available for dispensing layup material 166 while the remaining second lamination assembly 154 is available for replacement of the material roll 162 may avoid the need for two separate lamination heads (not shown), one of which is positioned for dispensing layup material while the other lamination head is positioned for reloading with a new or different material roll.

Referring to FIG. 29, shown is a flowchart of operations included in a method 500 of bi-directionally applying layup material 166 onto a substrate 118. Step 502 of the method 500 includes feeding backed material 164 from a material roll 162 to a backing layer separation assembly 220 of a lamination head 140. As described above and shown in the figures, the material roll 162 is mounted on the material supply drum 160. The backed material 164 comprises layup material 166 backed by a backing layer 168. The backing layer separation assembly 220 has a backing layer directional control device 224 that is movable between a first mode separation position 304 and a second mode separation position 306 as shown in FIG. 6.

When the backing layer directional control device 224 is in the first mode separation position 304 as shown in FIG. 16, step 504 of the method 500 includes separating the layup material 166 from the backing layer 168 using the first backing layer separation mechanism 250 while applying layup material 166 to the substrate 118 when moving the lamination head 140 along the first direction of travel 370. Step 506 of the method 500 includes moving the backing layer directional control device 224 from the first mode separation position 304 to the second mode separation position 306 as shown in FIG. 17. The step 506 of moving the backing layer directional control device 224 from the first mode separation position 304 (FIG. 16) to the second mode separation position 306 (FIG. 18) may be performed by pivoting a pivoting device 310 about a proximal end 312 of the pivoting device 310. As a result of pivoting the pivoting device 310 about the proximal end 312, the distal end 314 of the pivoting device 310 moves between the first mode separation position 304 and the second mode separation position 306. As described above, the distal end 314 of the pivoting device 310 positions the backed material 164 into close proximity to the first backing layer separation mechanism 250 or the second backing layer separation mechanism 270 to allow respectively allow the first separator edge 254 or the second separator edge 274 to engage the layup material leading edge 174.

Referring briefly FIG. 26, in an alternative embodiment, the step 506 of moving the backing layer directional control device 224 from the first mode separation position 304 to the second mode separation position 306 may be performed by translating a translating device 320 between the first mode separation position 304 and the second mode separation position 306. For example, the transiting device may be translated via a linear motion mechanism (not shown) controlled by the controller 130. As described above, the translating device 320 may be provided as a stub 322, a roller 324, or any one a variety of other devices configured to translate between the first mode separation position 304 and the second mode separation position 306.

In still further examples, the method 500 may include moving the backing layer directional control device 224 between the neutral position 300, the first mode separation position 304, and the second mode separation position 306. As described above and shown in FIG. 13, the neutral position 300 may be located between the first mode separation position 304 and the second mode separation position 306. Positioning the backing layer directional control device 224 in the neutral position 300 may provide clearance and access for servicing the first backing layer separation mechanism 250 and the second backing layer separation mechanism 270. When the backing layer directional control device 224 is in the neutral position 300, clearance in access may also be provided to the first backing layer separation mechanism 250 and the second backing layer separation mechanism 270 by at least partially retracting the backing layer directional control device 224 into a retracted position 302 within the lamination head 140 as shown in FIG. 14.

When the backing layer directional control device 224 is in the second mode separation position 306 as shown in FIG. 18, the method 500 includes step 508 of separating the layup material 166 from the backing layer 168 using the second backing layer separation mechanism 270 while applying layup material 166 to the substrate 118 when moving the lamination head 140 along the second direction of travel 372 opposite the first direction of travel 370. As described above, during the application of layup material 166 along the first direction of travel 370 and/or along the second direction of travel 372, the method 500 may include cutting the layup material 166 by moving a cutter blade 350 across the layup material 166 as shown in FIGS. 22-25. Cutting the layup material 166 while leaving the backing layer 168 intact results in the creation of a layup material leading edge 174 and a layup material trailing edge 176. As described above, the first separator edge 254 of the first backing layer separator 252 and the second separator edge 274 of the second backing layer separator 272 are each configured to engage the layup material leading edge 174 and guide the layup material 166 respectively onto the first guide member 256 and second guide member 276 when the backing layer directional control device 224 is respectively in the first mode separation position 304 (FIG. 16) and the second mode separation position 306 (FIG. 18).

The method 500 may include cutting the layup material 166 as the backed material 164 moves through the cutter assembly 340. For example, as shown in FIGS. 22-25 and described above, the method may include moving the cutter blade 350 across the layup material 166 along a blade travel vector 354 that is proportional to a material feed rate 360 of the backed material 164. For forming an intended cut line 358 oriented perpendicular to the lengthwise direction of the backed material 164, the method 500 includes moving the cutter blade 350 across the material width of the layup material 166 at a blade travel vector 354 having a longitudinal component 356 that is equivalent to the material feed rate 360.

In some examples, step 504 of separating the layup material 166 from the backing layer 168 using the first backing layer separation mechanism 250, and step 508 of separating the layup material 166 from the backing layer 168 using the second backing layer separation mechanism 270 respectively comprise using a first or second separator edge 254, 274 respectively of a first or second backing layer separator 252, 272 to separate the backing layer 168 from the layup material 166, and respectively using a first or second guide surface 258, 278 respectively of a first or second guide member 256, 276 to support the layup material 166 after separation from the backing layer 168 and to guide the layup material 166 onto the substrate 118. For example, step 504 includes using a first backing layer separator 252 to separate the layup material leading edge 174 from the backing layer 168 and using the first guide member 256 to guide the layup surface 116 onto the substrate 118. Step 508 includes using the second backing layer separator 272 to separate the layup material leading edge 174 from the backing layer 168 and using the second guide member 276 to guide the layup surface 116 onto the substrate 118. The method 500 may include winding the backing layer 168 onto the backing layer collection drum 180 during the separation of the backing layer 168 from the layup material 166.

As described above with regard to FIGS. 16 and 18, the first guide member 256 and the second guide member 276 each have a guide surface 258, 278 over which the layup material 166 slides prior to application of the layup material 166 onto the substrate 118. The method 500 may additionally include adjusting the first or second pitch angle 260, 280 (FIGS. 16 and 18) respectfully of the first for second guide surface 258, 278 respectively of the first or second guide member 256, 278 based upon the axial stiffness of the layup material 166. As mentioned above, a first or second pitch angle 260, 280 respectively of a first or second guide surface 258, 278 is measured relative to the portion of the layup material 166 located immediately upstream respectively of the first or second guide member 256, 276. The first or second pitch angle 260, 280 may be adjusted to be larger for a layup material 166 having a relatively high axial stiffness than the pitch angle 260, 280 for a layup material 166 having a relatively low axial stiffness. As shown in FIGS. 16 and 18, the method 500 may further include using a first compaction device 262 or a second compaction device 282 to apply compaction pressure onto the layup material 166 against the substrate 118 as the lamination head 140 moves respectively along the first direction of travel 370 and the second direction of travel 372.

In the above-described examples of the lamination head 140 having self-threading capability, the method 500 may include translating the backing layer collection drum 180 from a collection drum home position 182 (FIG. 6) to a collection drum engagement position 184 (FIG. 7) proximate the material supply drum 160 prior to feeding layup material 166 from the material supply drum 160 to the backing layer separation assembly 220. The method may additionally include engaging the backing layer collection drum 180 with the backing layer leading edge 170 of the backing layer 168 as shown in FIG. 7. Upon engaging the backing layer leading edge 170, the method may include translating the backing layer collection drum 180 back to the collection drum home position 182 while dispensing a threadable portion 172 of at least the backing layer 168 between the material supply drum 160 and the backing layer collection drum 180 as shown in FIG. 12. The method may then include translating the backing layer directional control device 224 from the separation device home position 226 (FIG. 12) to the separation device engagement position 228 as shown in FIG. 13. In addition, the method may include moving the threadable portion 172 into proximity to the first backing layer separation mechanism 250 and/or the second backing layer separation mechanism 270. When the material roll 162 on the material supply drum 160 is depleted of layup material 166, the method 500 may including rewinding the backing layer 168 on the backing layer collection drum 180 back onto the material supply drum 160 as described above for method 400 and as illustrated in FIGS. 19-21.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A lamination head having bi-directional layup capability, comprising:
  a material supply drum configured to support a material roll of backed material, the backed material comprising layup material backed by a backing layer;
  a backing layer separation assembly configured to receive the backed material from the material supply drum and having a backing layer directional control device, a first backing layer separation mechanism, and a second backing layer separation mechanism;
  the backing layer directional control device being movable at least between a first mode separation position and a second mode separation position;
  the backing layer directional control device in the first mode separation position being aligned with the first backing layer separation mechanism for separating the backing layer from the layup material while the layup material is applied to a substrate as the lamination head moves along a first direction of travel; and the backing layer directional control device in the second mode separation position being aligned with the second backing layer separation mechanism for separating the backing layer from the layup material while the layup material is applied to the substrate as the lamination head moves along a second direction of travel opposite the first direction of travel.

2. The lamination head of claim 1, wherein the backing layer directional control device comprises:
a pivoting device having a proximal end and a distal end; and
the pivoting device being pivotable about the proximal end to move the distal end between the first mode separation position and the second mode separation position.

3. The lamination head of claim 2, wherein the pivoting device comprises:
a proximal belt roller and a distal belt roller spaced apart from each other and surrounded by a roller belt; and
the roller belt moving around the proximal belt roller and the distal belt roller as the backing layer moves with the roller belt.

4. The lamination head of claim 1, wherein the backing layer directional control device comprises:
a translating device configured to translate between the first mode separation position and the second mode separation position.

5. The lamination head of claim 4, wherein the translating device comprises:
a stub having an outer surface configured to have the backing layer slidably bear against the outer surface; or
a roller configured to freely rotate about a roller axis as the backing layer moves over the roller.

6. The lamination head of claim 1, wherein:
the first backing layer separation mechanism and the second backing layer separation mechanism each have a backing layer separator and a guide member;
the backing layer separator having a separator edge configured to separate the backing layer from the layup material; and
the guide member having a guide surface configured to support the layup material after separation from the backing layer and guide the layup material onto the substrate.

7. The lamination head of claim 6, wherein:
the guide member of the first backing layer separation mechanism and/or the second backing layer separation mechanism being pivotably adjustable for adjusting a pitch angle of the guide surface relative to a lengthwise portion of the layup material located immediately upstream of the guide member.

8. The lamination head of claim 1, wherein:
the backing layer directional control device is movable from a neutral position to the first mode separation position and movable from the neutral position to the second mode separation position.

9. The lamination head of claim 1, further comprising:
a mounting frame having a first side and a second side opposite the first side;
a first lamination assembly mounted to the first side and having the material supply drum and the backing layer separation assembly;
a second lamination assembly mounted to the second side and having a same arrangement of the material supply drum and the backing layer separation assembly as in the first lamination assembly; and
the mounting frame being pivotable about a vertical axis to make the first lamination assembly available to apply layup material to the substrate while making the second lamination assembly available for replacement of the material roll.

10. The lamination head of claim 1, further comprising:
a backing layer collection drum configured to translate from a collection drum home position to a collection drum engagement position proximate the material supply drum, engage a leading edge of the backing layer on the material roll, and
translate back to the collection drum home position while dispensing a threadable portion of at least the backing layer between the material supply drum and the backing layer collection drum; and
the backing layer directional control device configured to translate from a separation device home position to a separation device engagement position and engage the threadable portion for moving the threadable portion into alignment with the first backing layer separation mechanism or the second backing layer separation mechanism; and
the backing layer collection drum configured to take up the backing layer during separation of the backing layer from the layup material.

11. A lamination head having bi-directional layup capability, comprising:
a material supply drum configured to support a material roll of backed material, the backed material comprising layup material backed by a backing layer;
a backing layer separation assembly configured to receive the backed material from the material supply drum and having a backing layer directional control device, a first backing layer separation mechanism, and a second backing layer separation mechanism;
the backing layer directional control device being movable at least between a first mode separation position and a second mode separation position;
the backing layer directional control device in the first mode separation position being aligned with the first backing layer separation mechanism, the first backing layer separation mechanism having a first backing layer separator configured to separate the backing layer from the layup material and direct the layup material toward a substrate as the lamination head moves along a first direction of travel; and
the backing layer directional control device in the second mode separation position being aligned with the second backing layer separation mechanism, the first backing layer separation mechanism having a second backing layer separator configured to separate the backing layer from the layup material and direct the layup material toward the substrate as the lamination head moves along a second direction of travel.

12. A method of bi-directionally applying layup material onto a substrate, comprising:
feeding a backed material from a material roll to a backing layer separation assembly of a lamination head, the material roll mounted on a material supply drum, the backed material comprising layup material backed by a backing layer, the backing layer separation assembly having a backing layer directional control device movable between a first mode separation position and a second mode separation position;
separating, with the backing layer directional control device in the first mode separation position, the layup material from the backing layer using a first backing layer separation mechanism while applying layup material to the substrate when moving the lamination head along a first direction of travel;

moving the backing layer directional control device from the first mode separation position to the second mode separation position; and separating, with the backing layer directional control device in the second mode separation position, the layup material from the backing layer using a second backing layer separation mechanism while applying layup material to the substrate when moving the lamination head along a second direction of travel opposite the first direction of travel.

13. The method of claim 12, wherein the step of moving the backing layer directional control device from the first mode separation position to the second mode separation position comprises:

pivoting a pivoting device about a proximal end of the pivoting device; and moving a distal end of the pivoting device between the first mode separation position and the second mode separation position as a result of pivoting the pivoting device about the proximal end.

14. The method of claim 13, wherein the pivoting device comprises:

a proximal belt roller and a distal belt roller spaced apart from each other and surrounded by a roller belt; and the roller belt moving around the proximal belt roller and a distal belt roller as the backing layer moves with the roller belt.

15. The method of claim 12, wherein the step of moving the backing layer directional control device from the first mode separation position to the second mode separation position comprises:

translating a translating device between the first mode separation position and the second mode separation position.

16. The method of claim 12, wherein the steps of separating the layup material from the backing layer using the first backing layer separation mechanism and separating the layup material from the backing layer using the second backing layer separation mechanism each comprise:

separating, using a separator edge of a backing layer separator, the backing layer from the layup material; and supporting, using a guide surface of a guide member, the layup material after separation from the backing layer and guiding the layup material onto the substrate.

17. The method of claim 16, further comprising:

adjusting a pitch angle of the guide surface of the guide member of the first backing layer separation mechanism and/or the second backing layer separation mechanism; and the pitch angle of the guide surface being relative to a portion of the layup material immediately upstream of the guide member.

18. The method of claim 12, further comprising:

moving the backing layer directional control device between a neutral position, the first mode separation position and the second mode separation position; and the neutral position being located between the first mode separation position and the second mode separation position.

19. The method of claim 12, wherein the lamination head includes a mounting frame having a first lamination assembly mounted to a first side of the mounting frame supporting the material supply drum and the backing layer separation assembly, and having a second lamination assembly mounted to a second side of the mounting frame opposite the first side, the second lamination assembly having a substantially similar arrangement of a material supply drum and a backing layer separation assembly as in the first lamination assembly, the method further comprising:

applying layup material to the substrate using the first lamination assembly; and pivoting the mounting frame about a vertical axis to make the second lamination assembly available for applying layup material to the substrate while making the first lamination assembly available for replacing the material roll.

20. The method of claim 12, wherein prior to feeding layup material from the material supply drum to the backing layer directional control device, the method comprises:

translating a backing layer collection drum from a collection drum home position to a collection drum engagement position proximate the material supply drum;

engaging the backing layer collection drum with a backing layer leading edge of the backing layer;

translating the backing layer collection drum back to the collection drum home position while dispensing a threadable portion of at least the backing layer between the material supply drum and the backing layer collection drum;

translating the backing layer directional control device from a separation device home position to a separation device engagement position; and moving, in response to translation of the backing layer directional control device, the threadable portion into proximity to the first backing layer separation mechanism or the second backing layer separation mechanism.

* * * * *